(12) United States Patent
Song

(10) Patent No.: US 12,205,014 B2
(45) Date of Patent: Jan. 21, 2025

(54) NEURAL NETWORK UNIT

(71) Applicant: ANAFLASH INC., San Jose, CA (US)

(72) Inventor: Seung-Hwan Song, Palo Alto, CA (US)

(73) Assignee: Anaflash Inc., San Jose, CA (US)

( * ) Notice: Subject to any disclaimer, the term of this patent is extended or adjusted under 35 U.S.C. 154(b) by 936 days.

(21) Appl. No.: 17/163,513

(22) Filed: Jan. 31, 2021

(65) Prior Publication Data

US 2021/0241084 A1 Aug. 5, 2021

Related U.S. Application Data

(60) Provisional application No. 62/969,579, filed on Feb. 3, 2020.

(51) Int. Cl.
*G06N 3/00* (2023.01)
*G06N 3/04* (2023.01)
*G06N 3/063* (2023.01)

(52) U.S. Cl.
CPC ............... *G06N 3/063* (2013.01); *G06N 3/04* (2013.01)

(58) Field of Classification Search
CPC .................................. G06N 3/063; G06N 3/04
See application file for complete search history.

(56) References Cited

U.S. PATENT DOCUMENTS

2012/0250440 A1* 10/2012 Wu ....................... G11C 11/413
365/207
2019/0042160 A1* 2/2019 Kumar .................. G06F 3/0659
2019/0087715 A1* 3/2019 Jeng ..................... G11C 13/0028
2020/0218963 A1* 7/2020 Yasuda ................... G06N 3/048
2020/0301667 A1* 9/2020 Hung ................. G11C 16/0416

OTHER PUBLICATIONS

X. Sun, R. Liu, X. Peng and S. Yu, "Computing-in-Memory with SRAM and RRAM for Binary Neural Networks," 2018 14th IEEE International Conference on Solid-State and Integrated Circuit Technology (ICSICT), Qingdao, China, 2018, pp. 1-4, doi: 10.1109/ICSICT.2018.8565811. (Year: 2018).*

* cited by examiner

*Primary Examiner* — Barbara M Level

(57) ABSTRACT

A neural network unit is disclosed. This neural network unit includes: a main synapse array having a plurality of main synapses in rows and columns of the array, each connected to one or more bit lines associated with the network unit; a main synapse driver for applying an input to one or more of the main synapses in a row; a reference synapse for generating a particular output to a selected one or more associated bit lines; and, a sensing circuit for controlling the reference synapse in generating the output in a selected column of the array, wherein the sensing circuit is adapted to infer an output from one or more main synapses in a selected column by: defining a reference range of the output to be generated by reference synapse; setting a reference level from the reference range; activating a selected reference synapse to implement the reference level that is set or adjusted; and comparing an output from the main synapse summed with the output from the activated reference synapse in the selected column with a threshold value predetermined.

18 Claims, 21 Drawing Sheets

NEURAL NETWORK UNIT

CROSS-REFERENCE TO RELATED APPLICATION

This application claims the benefits of priority, under 35 U.S.C. § 119 of U.S. Provisional Application No. 62/969,579, filed Feb. 3, 2020, titled "Binary search read method" which is hereby incorporated by reference in its entirety.

TECHNICAL FIELD OF THE INVENTION

This invention describes a neural network unit and method for performing a binary search read method to sense the BL current level (BL_CUR) using multiple voltage-controlled current source and single-bit sense amplifier circuits. The proposed read scheme can sense the BL current level with N-bit resolution (N=1, 2, 3, 4 . . . ) by N-step binary search.

BACKGROUND OF THE INVENTION

A neural network unit is a key building block for artificial intelligence and machine learning devices. Multiply-and-accumulate (MAC) is one of the key operations of the neural network unit. U.S. patent application Ser. No. 17/022,137, titled "Multiply-Accumulator Circuits," described how to perform such MAC operations efficiently using a computer-in-memory architecture where the computation is performed in the place where the data is stored. U.S. patent application Ser. No. 17/109,114, titled "serialized neural network computing unit" disclosed a neural network unit that performs such MAC operations using a bit serialized control circuit. However, the prior computing unit requires $2^N-1$ steps for N-bit sensing. For example, the unit requires 7 ($=2^{(3)}-1$) steps for 3-bit sensing, and the unit requires 15 ($=2^{(4)}-1$) steps for 4-bit sensing. Thus, with the previous neural network unit, the read time exponentially increases for the higher resolution since the number of steps exponentially increases as resolution increases.

SUMMARY OF INVENTION

This invention discloses the binary search read method to sense the BL current level (BL_CUR) using one or more multiple voltage-controlled current source and single-bit sense amplifier circuits. The proposed read scheme can sense the BL current level with N-bit resolution (N=1, 2, 3, 4 . . . ) by N-step binary search. Thus, the read time linearly increases for the higher resolution since the number of steps linearly increases as resolution increases.

An embodiment in accordance with the present invention provide a neural network unit including: a main synapse array having a plurality of main synapses in rows and columns of the array, each connected to one or more bit lines associated with the network unit; a main synapse driver for applying an input to one or more of the main synapses in a row; a reference synapse for generating a particular output to a selected one or more associated bit lines; and, a sensing circuit for controlling the reference synapse in generating the output in a selected column of the array, wherein the sensing circuit is adapted to infer an output from one or more main synapses in a selected column by: defining a reference range of the output to be generated by reference synapse; setting a reference level from the reference range; activating a selected reference synapse to implement the reference level that is set or adjusted; and comparing an output from the main synapse summed with the output from the activated reference synapse in the selected column with a threshold value predetermined.

In one embodiment, the sensing circuit is further configured to perform the steps of (a) adjusting the reference range to a sub-range depending on the comparison result; (b) adjusting the reference level to an approximated middle of the adjusted reference range; (c) comparing a summed output including an output corresponding to the adjusted reference level from the selected reference synapse with the threshold value; and (d) repeating steps (a) to (c) according to a specified number of times or until the inferred output refined through the repeating steps reaches a target resolution specified.

In one embodiment, the sensing circuit is further configured to adjust the reference range to a lower sub-range if the summed output is equal to or greater than the threshold value, or otherwise adjust the reference range to a higher sub-range, and the main synapse driver is further configured to serially apply a plurality of voltage input sequences corresponding to an input data to one or more of the main synapses in the row.

In one embodiment, the sensing circuit is further configured to: receive an output current from one or more of the main synapses via a connected bit line in the selected column; set a reference range of the output current generated by the reference synapse that a binary search scheme to apply; define a reference level from the reference range; set none, one or more current sources in the selected reference synapse to generate an output corresponding to the reference level; compare an output current from the main synapse summed with the output current from the selected reference synapse in the column with a threshold value specified; and convert the comparison result into a corresponding binary signal.

In one embodiment, the sensing circuit is further configured to perform the steps of: (a) adjusting the reference range to a sub-range depending on the comparison result; (b) adjusting the reference level to an approximate middle of the adjusted reference range; (c) comparing a summed output current including an output current corresponding to the adjusted reference level from the selected reference synapse with the threshold value; and (d) repeating steps (a) to (c) according to the specified number of times or until the inferred output refined through the repeating steps reaches a target resolution specified.

An embodiment in accordance with the present invention provide a neural network unit including: a main synapse array having a plurality of main synapses in rows and columns of the array, each main synapse for producing a differential output pair connected to one or more pairs of bit lines associated with the network unit; a main synapse driver for applying a pair of input to the one or more main synapses in a row, a reference synapse for generating a particular pair of outputs to a selected one or more associated pairs of bit lines; and a sensing circuit for controlling the reference synapse in generating the pair of outputs: defining a reference range of the output to be generated by reference synapse; setting a pair of reference levels from the reference range; activating the selected reference synapse to implement the reference level that is set or adjusted; and comparing a first and a second output of the differential output pair, wherein each accumulated output includes the output from the main synapse and the output from a reference synapse selected.

In one embodiment, the sensing circuit is further configured for implementing steps of: (a) adjusting the reference range to a sub-range depending on the comparison result, (b) adjusting the reference level to an approximated middle of the adjusted range, (c) comparing a first and second output of the differential output pair, each output generated by the main synapse summed with an output corresponding to the adjusted reference level, and (d) repeating steps (a) to (c) according to a specified number of times or until the inferred output refined through the repeating steps reaches a target resolution specified.

In one embodiment, the sensing circuit is further configured for implementing a step of adjusting the reference range to a lower sub-range if the first output is equal to or greater than the second output, or otherwise adjust the reference range to a higher sub-range, and the main synapse driver is further configured to serially apply a plurality of voltage input sequences corresponding to a plurality of input data to the one or more synapses in the row.

In one embodiment, the sensing circuit is further configured to: receive an output current from one or more of the main synapses via the associated bit line in the selected column; set a reference range of the output current generated by the reference synapse that a binary search scheme to apply; define a reference level from the reference range; set none, one or more current sources in the selected reference synapse to generate an output corresponding to the reference level; compare an output current from the main synapse summed with the output current from the selected reference synapse with a threshold current value specified; and convert the comparison result into a corresponding binary signal.

An embodiment in accordance with the present invention provide a method for inferring an output from a synapse array, including: receiving an output of one or more main synapses in each selected column of the synapse array; defining a reference range of an output to be generated by a reference synapse in the selected column; setting a reference level from the defined reference range; activating the selected reference synapse to implement the reference level that is set or adjusted; and comparing a sum of an output from the main synapse and an output from a reference synapse with a threshold value predefined.

In one embodiment, the method further comprises: (a) adjusting the reference range to a sub-range depending on the comparison result; (b) adjusting the reference level to an approximated middle of the adjusted range; (c) comparing a summed output including an output corresponding to the adjusted reference level from the selected column synapses with the threshold value; and (d) repeating steps (a) to (c) according to a specified number of times or until an inferred output refined through the repeating steps reaches a target resolution specified.

In one embodiment, the method further comprises adjusting the reference range to a lower sub-range if the summed output is equal to or greater than the threshold value, or otherwise adjusting the reference range to a higher sub-range. In one embodiment, the one or more of the main synapses is configured to receive a plurality of voltage input sequence from a main synapse driver connected to the synapse array, wherein the main synapse driver is configured to serially apply the plurality of voltage input sequences corresponding to an input data to one or more of the main synapses in the row. In one embodiment, the method further comprises generating an output sequence depending on the comparison result of the summed output to the threshold value.

An embodiment in accordance with the present invention provide a method for inferring a differential output from a synapse array, comprising: receiving first and second outputs from one or more main synapses in a synapse array via one or more associated bit lines; defining a reference range of an output to be generated by a reference synapse connected to the one or more synapses; setting a reference level from the reference range; activating the selected reference synapse to produce an output corresponding to the reference level that is set or adjusted; and comparing first and second accumulated outputs, wherein each accumulated output includes the output from the main synapse and the output from a reference synapse selected.

In one embodiment, the method further comprising: (a) adjusting the reference range to a sub-range depending on the comparison result, (b) adjusting the reference level to an approximated middle of the adjusted range, (c) comparing a first and second accumulated output of the differential output pair, one of the accumulated outputs generated by the main synapse summed with an output from the reference synapse corresponding to the adjusted reference level, and, (d) repeating steps (a) to (c) according to a specified number of times or until the inferred difference refined through the repeating steps reaches a target resolution specified.

In one embodiment, the neural network further comprises adjusting the reference range to a lower sub-range if the first accumulated output is equal to or greater than the second accumulated output, or otherwise adjusting the reference range to a higher sub-range. In one embodiment, a main synapse driver associated with the synapse array is configured to serially apply a plurality of voltage input sequences corresponding to a plurality of input data to one or more of the main synapses in the row.

BRIEF DESCRIPTION OF THE DRAWINGS

Features of the present invention will become apparent to those skilled in the art from the following description regarding the drawings. Understanding that the drawings depict only typical embodiments of the invention and are not, therefore, to be considered limiting in scope, the invention will be described with additional specificity and detail through the use of the accompanying drawings, in which.

DETAILED DESCRIPTION OF THE INVENTION

Figure 1:
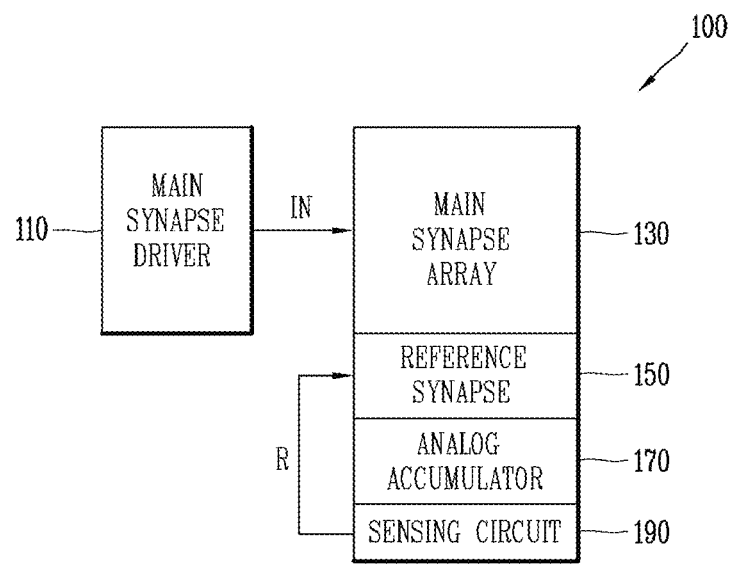
FIG. 1 is a block diagram of a neural network unit according to the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings. It will be appreciated that for simplicity and clarity of illustration, elements shown in the figures have not necessarily been drawn to scale. Also, reference numerals may be repeated among the figures to indicate corresponding or analogous elements.

FIG. 1 is a block diagram of a neural network unit according to the present invention. The neural network unit circuit 100 comprises a main synapse driver 110, a main synapse array 130, a reference synapse 150, an analog accumulator 170, and a sensing circuit 190.

The main synapse driver 110 sequentially sends n-bit (binary) input data to each of the synapses in the main synapse array 130 such that a corresponding synapse generates an output signal corresponding to a function of input multiplied by the cell's weight stored. The main synapse array 130 is configured to receive an input signal (IN) from the main synapse driver 110, whereas the reference synapse 150 receives a control signal (R) from the sensing circuit 190. The main synapse array 130 may include one or more main synapses, each for generating an output based on a received input signal. The reference synapse 150 may include one or more reference cells for providing a particular output. The analog accumulator 170 can sum outputs generated by the synapses and provide the corresponding output signal to the sensing circuit 190.

The sensing circuit 190 is configured to implement various functions. For instance, upon sensing the output from the analog accumulator 140, the sensing circuit 190 can determine whether the sensed output is more or less than a predefined threshold value. Once sensing the sensed output being equal to or greater than the threshold level, the sensing circuit 190 can generate a high sensing output signal (H). Otherwise, it can generate a low sensing output signal (L) to its output node SO (not shown). Based on the sensed output, the control signal (R) is generated accordingly for the next step of sensing. The sensing circuit 190 can include key sub-blocks such as a register, a data memory, a code memory, a one-time-programmable or read-only or other nonvolatile memory, a timing circuit, or a digital processing circuit. A register can store a key configuration for the sensing circuit 190 to perform the intended operation. Data memory can store the digital input data to be provided to the reference synapse 150. The code memory is configured to store the operation of the sensing circuit 190.

Figure 2A:
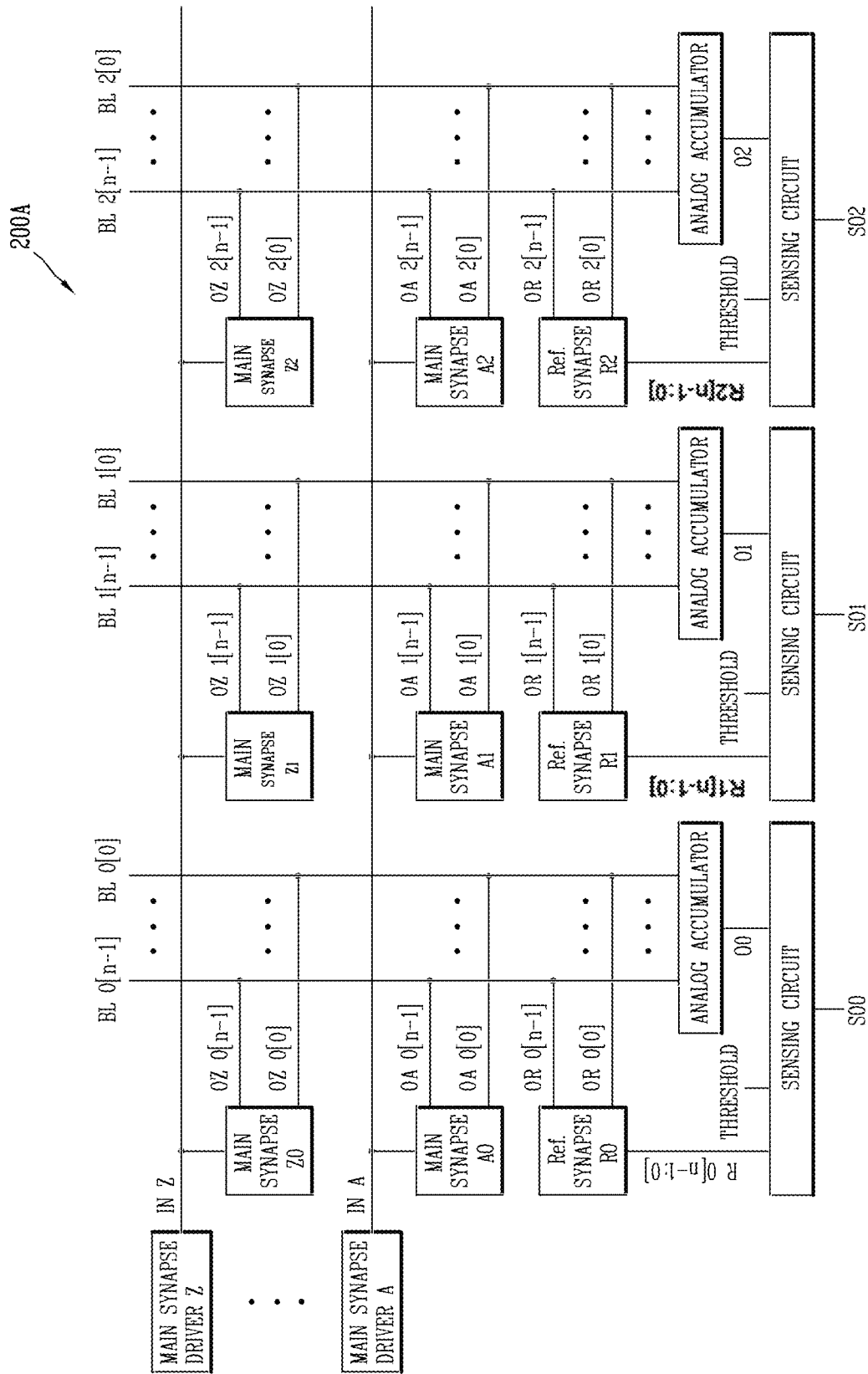
FIG. 2A is a block diagram of one embodiment of a synapse array for performing an unsigned operation.
Figure 3A:
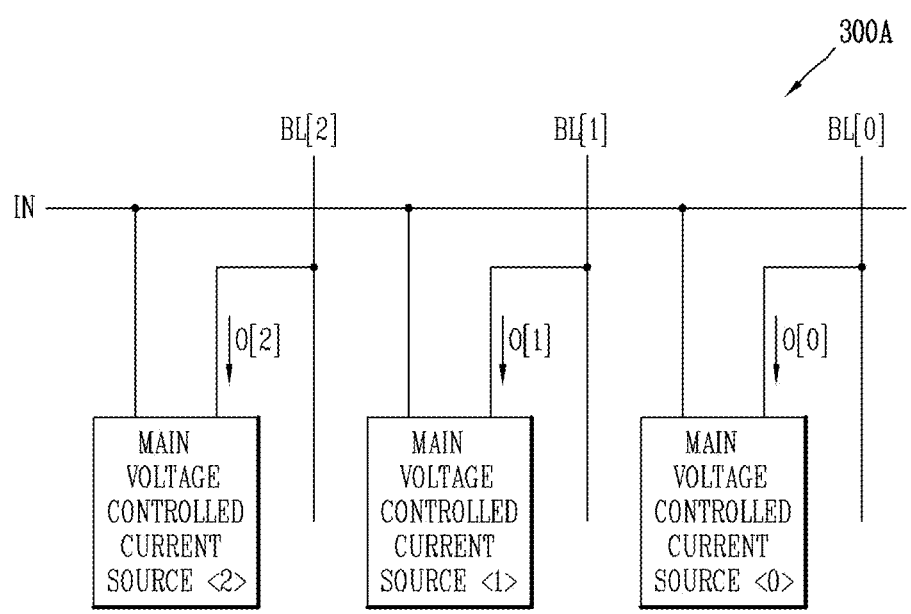
FIG. 3A is a block diagram of one embodiment of a main synapse for performing an unsigned operation.
Figure 4A:
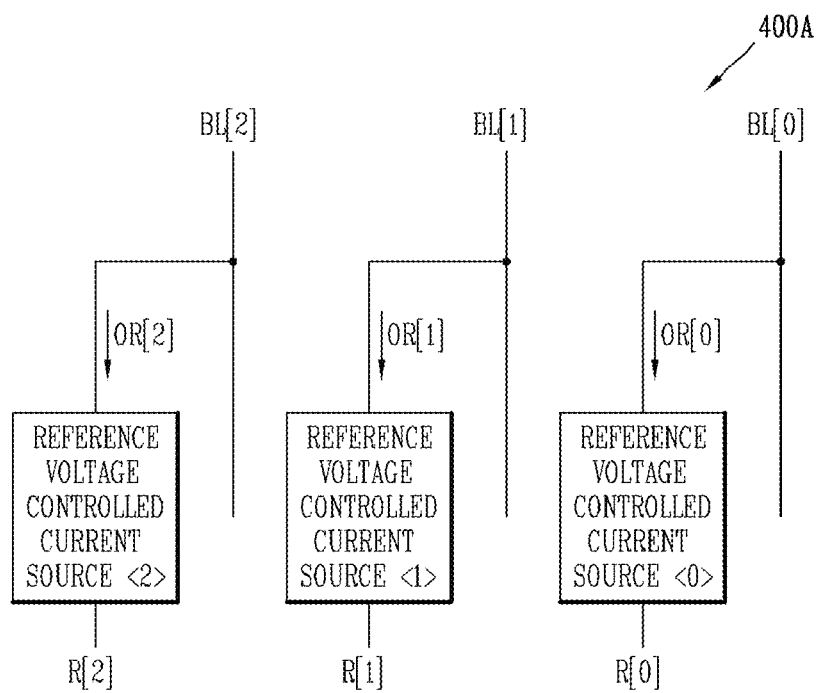
FIG. 4A is a block diagram of one embodiment of a reference voltage-controlled current source for performing an unsigned operation.

FIG. 2A is a block diagram of one embodiment of a synapse array for performing an unsigned operation. In FIG. 2A, the synapse array 200A comprises three columns, each including a plurality of main synapses A~Z for receiving input signals IN A~IN Z, the reference synapse R, an analog accumulator, and a sensing circuit coupled to the analog accumulator. Although the number of the main synapses A~Z are not specified, it should be understood that a various number of the main synapses can be arranged to meet diverse technical needs. The main synapses in a row can be activated by the corresponding one of the multiple synapse drivers A~Z. Each main synapse is coupled to its own bit line BL. The structure of the main synapse is illustrated in FIG. 3A. The reference synapse R and the main synapses A~Z in a column share the bit lines. Thus, the product output from the main synapses A~Z in each column is summed with a reference output from the reference synapse R via their sharing bit line. The structure of each reference synapse is illustrated in FIG. 4A.

The analog accumulator in each column can sum the currents from the main and reference synapses over the bit lines from bit (n−1) to bit 0 associated with the input signals (INA~INZ) and control signals (R[n−1]~R [0]) at a specific time interval. For instance, the analog accumulator may sum the current from the main synapses A~Z and the current from reference synapse R. The sensing circuit in each column is configured to activate or deactivate the corresponding reference synapse R0, R1, or R2 via the control signal lines R0[n−1:0], R1[n−1:0] or R2[n−1:0].

In one embodiment, the sensing circuit 190 in each column can be embedded by one or more control circuit electrically connected to the reference synapse, and the one or more circuits is configured to infer an output from the one or more main synapses connected in a column by: defining a reference range of the output to be generated by reference synapse; setting a reference level from the reference range; activating a selected reference synapse to implement the reference level that is set or adjusted; and comparing a sum of an output from the main synapse summed and the output from the activated reference synapse in the selected column with a threshold value predetermined. Also, the sensing circuit 190 can be further configured to perform the steps of: (1) adjusting the reference range to a sub-range depending on the comparison result; (2) adjusting the reference level to an approximated middle of the adjusted reference range; (3) comparing a summed output including an output corresponding to the adjusted reference level from the selected reference synapse with the threshold value; and (4) repeating steps (1) to (3) according to a specified number of times or until the inferred output refined through the repeating steps reaches a target resolution specified. The sensing circuit 190 is further configured to adjust the reference range to a lower sub-range if the summed output is equal to or greater than the threshold value, or otherwise adjust the reference range to a higher sub-range. The sensing circuit 190 is further configured to generate a high sensing signal when the summed output is equal to or greater than the threshold value, or otherwise generate a low sensing signal.

Figure 2B:
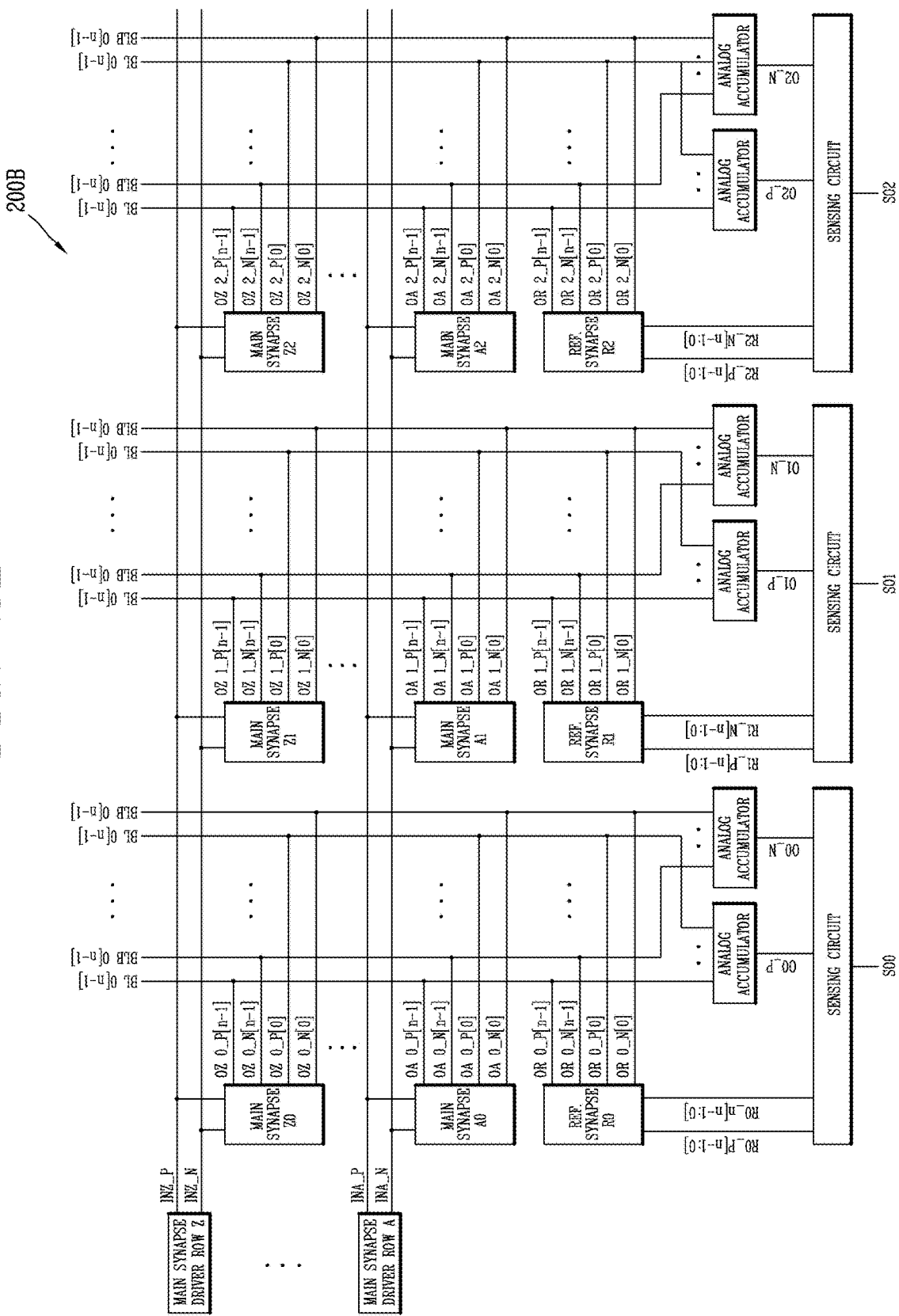
FIG. 2B is a block diagram of one embodiment of a synapse array for performing a signed operation.
Figure 3B:
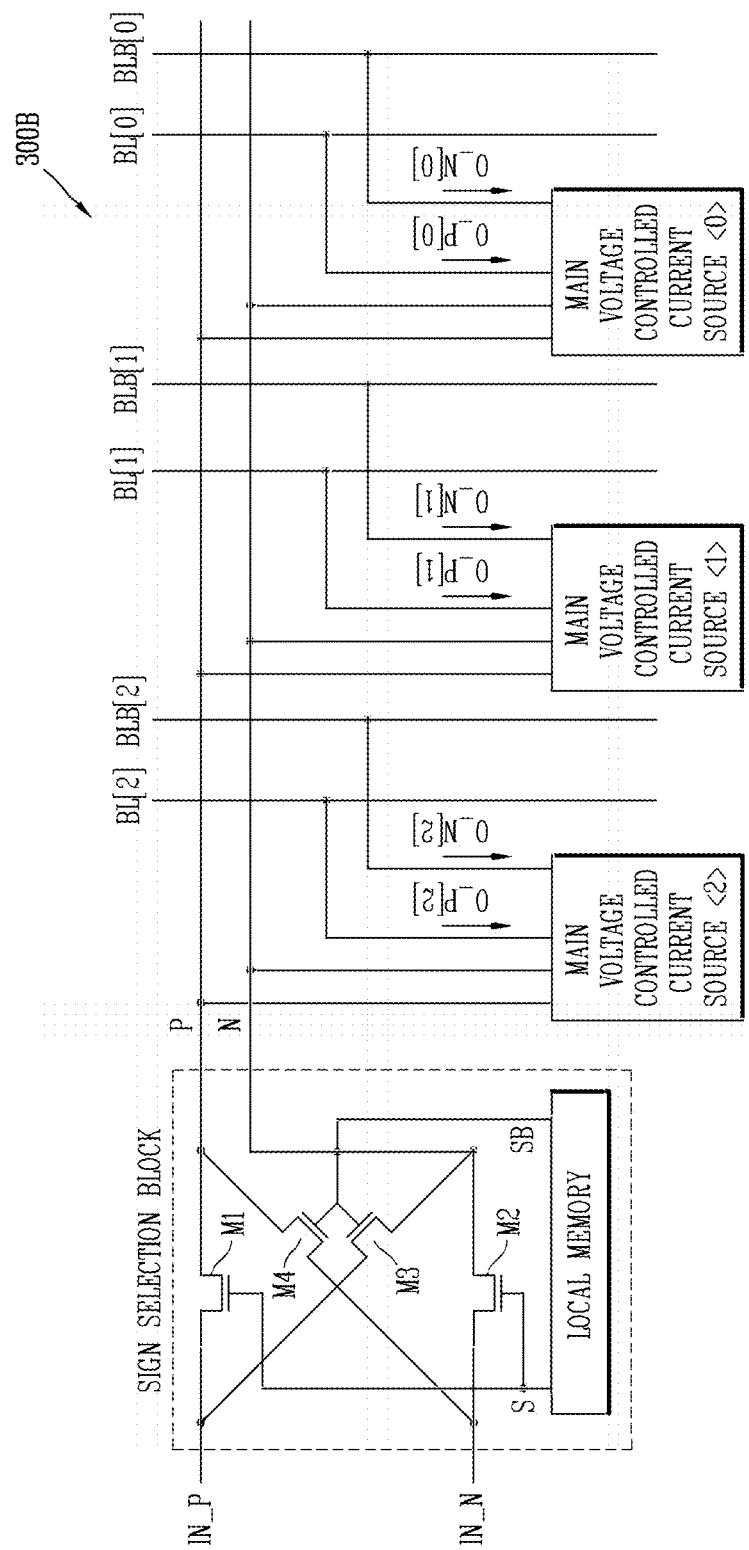
FIG. 3B is a block diagram of one embodiment of a main synapse for performing a signed operation.

FIG. 2B shows a block diagram of the synapse array for performing a signed operation. In FIG. 2B, the synapse array 200B comprises three columns, each having a plurality of main synapses A~Z for receiving pairs of inputs (ex. INA_P and INA_N, . . . , INZ_P and INZ_N) via the corresponding input lines. Note that the total number of the main synapses is not specified. Rather it can be varied depending on particular technical needs. Each main synapse driver is configured to apply a pair of input to the one or more main synapses in a row. The main synapses in a row share the common pair of inputs from the same main synapse driver. Each main synapse is configured to produce a differential output pair connected to one or more pairs of bit lines associated with the network unit. More specifically, the main synapse in each column provides signed product values OX[n−1] ~OX [0] into a plurality of positive bit lines BL[n−1]~BL [0] and negative bit lines BLB[n−1] ~BLB [0]. The structure of each main synapse is illustrated in FIG. 3B. A reference synapse in each column receives a plurality of positive control signals RX_P[n−1]~RX_P [0] and negative control signals RX_N[n−1] ~RX_N [0] from a sensing circuit in each column.

Figure 4B:
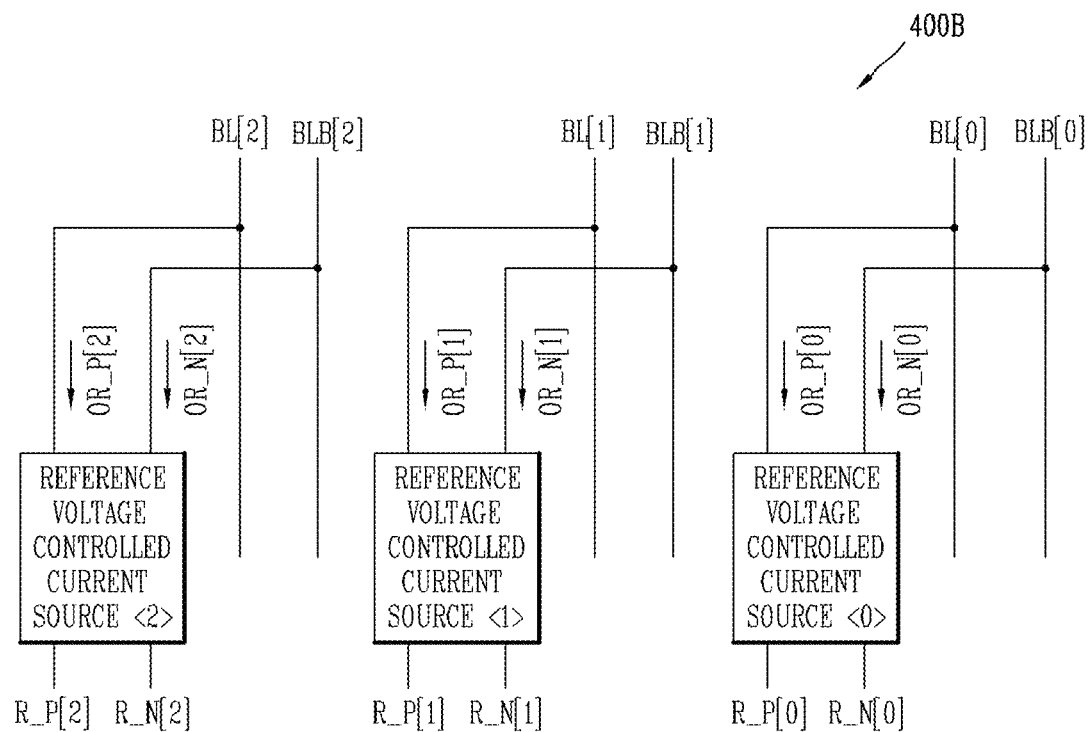
FIG. 4B is a block diagram of one embodiment of a reference voltage-controlled current source for performing a signed operation.

The main and reference synapses in a column share a pair of bit lines BL and BLB. Thus, each of P and N product outputs from the main synapses is summed with the reference P and N outputs from the reference synapse via their sharing pair of the bit line BL and BLB. The structure of each reference synapse is illustrated in FIG. 4B. A first analog accumulator in each column receives the summed P output signals OX_P[n−1]~OX_P [0] via the positive bit lines BL[n−1]~BL [0] for providing an accumulated positive output signal (OX_P) to the sensing circuit 190. A second analog accumulator in each column receives the summed N output OX_N[n−1]~OX_N [0] via the corresponding negative bit lines BLB[n−1]~BLB [0] for providing an accumulated negative output signal (OX_N) to the sensing circuit in the column.

In one embodiment, the sensing circuit 190 in each column can be embedded by one or more control circuit connected to the reference synapse, and the one or more control circuits is configured to perform one or more functions defined below:
1. receiving P and N outputs from the main synapses in each selected column of the synapse array;
2. defining a reference range of the output generated by reference synapse;
3. setting a reference synapse level from the reference range;
4. activating none, one or more current sources in the selected reference synapse to implement the calculated reference level;
5. comparing the accumulated P and N outputs, wherein the accumulated P and N output includes the output generated by the main synapses and summed with an output from the reference synapse selected;
6. generating a high sensing signal when the accumulated P output is equal to or greater than the accumulated N output, or otherwise generate a low sensing signal;
7. adjusting the reference range (defined as a range of reference synapse current to BL minus reference synapse current to BLB) to a lower sub-range if the first accumulated output P is equal to or greater than the accumulated output N, or otherwise, adjusting the reference range to a higher sub-range;
8. adjusting the reference level at an estimated middle of the adjusted range;
9. comparing the two newly accumulated P and N outputs, wherein each output includes the output from the main synapse and the output corresponding to the adjusted reference level selected;
10. generating a high sensing signal when the newly accumulated P output is equal to or greater than the accumulated N output, or otherwise generating a low sensing signal; and
11. repeating steps 7 to 10 according to the specified number of times or until the inferred output refined through the repeating steps reaches a target resolution specified.

FIG. 3A is a block diagram of one embodiment of the main synapse for performing an unsigned operation. The current sources in a row are configured to receive a shared input signal for producing a plurality of particular output products in the corresponding bit lines, respectively. And each of these output products can be merged into a single complete output by the analog accumulator, as shown in FIG. 2A. In FIG. 3A, the main voltage-controlled current sources <2>, <1>, <0> are configured to produce preset outputs O [2], O [1] and O [0] in their respective bit lines BL [2], BL [1] and BL [0] in response to input signals having a particular pattern via a commonly shared IN node. In more detail, as an example, when an input is a digital signal, the main voltage-controlled current sources each flow zero current (ex. O [2]=O [1]=O [0]=0 μA) in response to a low digital input signal. Otherwise, the voltage-controlled current source can flow a current corresponding to the predetermined current level upon receiving a high digital input signal.

FIG. 3B is a block diagram of one embodiment of the main synapse for performing a signed operation. In FIG. 3B, the sign selection block includes a first pair of MOS transistors M1, M2, and a second pair of MOS transistors M3, M4. The local memory's control signals for operating the transistors M1, M2, M3, and M4 flow in the input lines S and SB. Note that when activated via the input line S from the local memory, the first pair of MOS transistors M1 and M2 are turned on and supply (1) a positive input signal IN_P in the input line P and (2) a negative input signal IN_N in the input line N. On the other hand, when activated via the input line SB, the second pair of MOS transistors M3, M4 are turned on and supply (1) an input signal IN_P in the input line N and (2) an input signal IN_N in the input line P. The main voltage-controlled current sources <2>, <1>, <0> are configured to receive the particular inputs through the shared signal lines P and N for producing (a) positive product outputs O_P [2], O_P [1], and O_P [0] in positive bit lines BL [2], BL [1], and BL [0], respectively, and (b) negative product outputs O_N [2], O_N [1], and O_N [0] on negative bit lines BLB [2], BLB [1], and BLB [0], respectively. And each of these output products can be merged into a single complete output by the Analog Accumulator, as shown in FIG. 2B.

FIGS. 4A and 4B show a plurality of current sources in the reference synapse 150 in FIGS. 2A and 2B. The present invention is not, however, limited to this particular configuration. Like the main voltage-controlled current source in FIG. 3, the reference voltage-controlled current sources in FIG. 4 are configured to separately receive control signals and generate a particular product output on the corresponding bit lines.

FIG. 4A is a block diagram of one embodiment of a reference voltage-controlled current source for performing an unsigned operation. FIG. 4A shows reference voltage-controlled current source [0], [1] and [2], for performing unsigned operations. The reference voltage-controlled current sources are configured to receive the control signals R [0], R [1], and R [2] and generate the output OR [0], OR [1] and OR [2] in the bit lines BL [0], BL [1] and BL [2], respectively. FIG. 4B is a block diagram of one embodiment of a reference voltage-controlled source for performing a signed operation. FIG. 4B shows reference voltage controlled current source [0], [1] and [2] for performing a given signed operation. The reference voltage controlled current sources [0], [1] and [2] are configured to receive a pair of positive and negative signals (R_P[0], R_N[0]), (R_P[1], R_N[1]), and (R_P[2], R_N[2]) for producing (1) the pairs of partial output signals (OR_P[0], OR_N[0]) in the bit lines BL[0], BLB [0], (2) the pairs of partial output signals (OR_P[1],OR_N[1]) in the bit lines BL[1], BLB[1], and (3) the pairs of partial output signals (OR_P[2],OR_N[2]) in the bit lines BL[2], BLB[2], respectively.

FIGS. 5A-5H show schematic representations of the embodied voltage-controlled current sources for performing an unsigned operation as an embodiment of the synapses in FIG. 2.

Figure 5A:
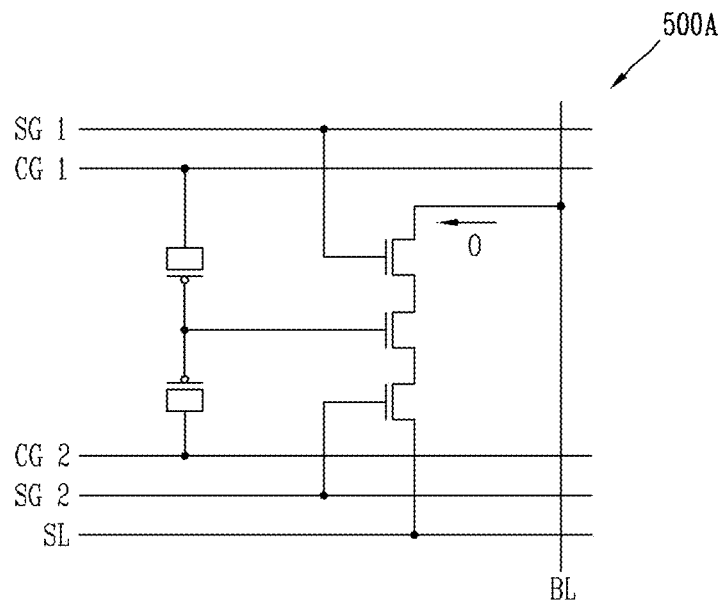
FIGS. 5A-5H illustrate schematic representations of the voltage-controlled current source for performing an unsigned operation.

In one embodiment, FIG. 5A shows a synapse including a logic Flash memory configured for producing an output signal O at a predefined level. The input signal is applied through a pair of signal lines CG1 and CG2. The weight parameter is stored in the logic Flash memory cell. The output signal O is supplied to the BL. The output signal O represents a multiplication of an input signal received and a weight parameter stored in the cell.

Figure 5B:
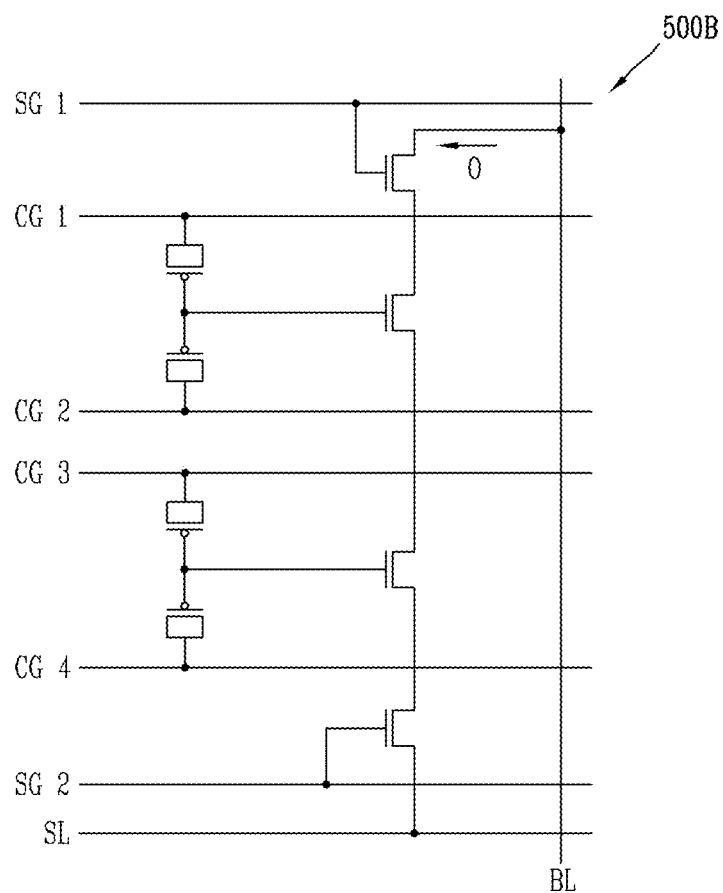

In another embodiment, FIG. 5B shows a synapse including a logic NAND Flash configured to produce an output current O at a predefined level. The input signal is applied through one selected pair among multiple signal line pairs (i.e., either pair of CG1/2 or CG3/4). The weight parameter is stored in the selected logic NAND Flash memory cell. The output signal O represents a multiplication of an input signal received and a weight parameter stored in the cell. The output signal O is supplied to the BL by turning on all other unselected cells and top/bottom switching transistors connected to SG1/2.

Figure 5C:
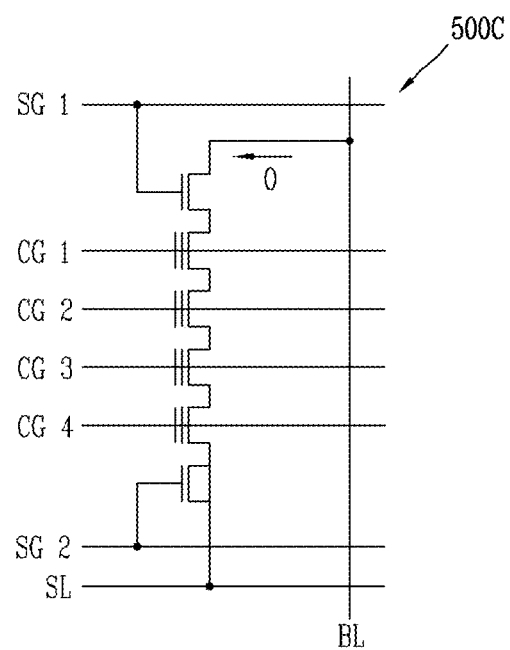

In another embodiment, FIG. 5C shows a synapse including a NAND Flash configured to produce an output current O at a predefined level. The input signal is applied through one selected signal line among multiple signal lines (CG1~CG4). The weight parameter is stored in the selected NAND Flash memory cell. The output signal represents a multiplication of an input signal received and a weight parameter stored in the cell. The output signal O is supplied to the BL by turning on all other unselected cells and top/bottom switching transistors connected to SG1/2.

Figure 5D:
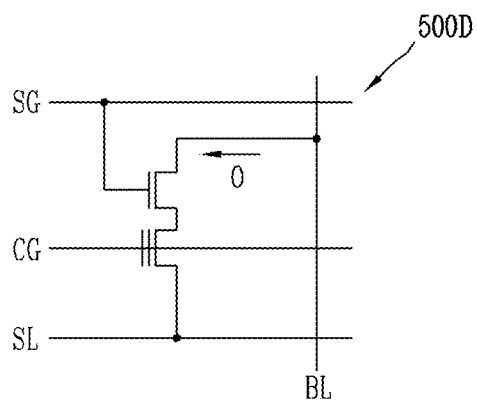

FIG. 5D shows a synapse using NOR Flash configured to produce an output signal O at a predefined level. The input signal is applied through a signal line CG. The weight parameter is stored in the NOR Flash memory cell. The output signal O represents a multiplication of an input signal and a weight parameter stored in the cell. The output current O is supplied to a bit line BL by turning the switching transistor connected to SG.

Figure 5E:
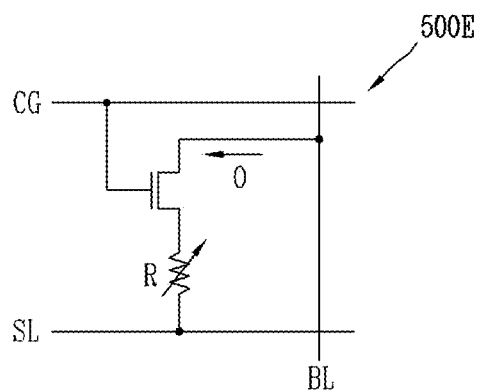

FIG. 5E shows a synapse including a resistive change memory with a transistor configured to produce an output signal O at a predefined level. The input signal is applied through a signal line CG. The weight parameter is stored in the variable resistor (R_w). The output signal O represents a multiplication of an input signal and a weight parameter. The output signal O is supplied to a bit line BL by turning the switching transistor connected to CG.

Figure 5F:
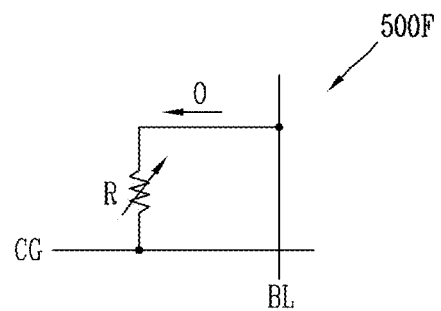

FIG. 5F shows a synapse including a resistive change memory without a transistor configured to produce an output current O at a predefined level. The input signal is applied through a signal line CG. The weight parameter is stored in the variable resistor R_w. The output signal O represents a multiplication of an input signal received and a weight parameter stored in the cell, supplied to a bit line BL.

Figure 5G:
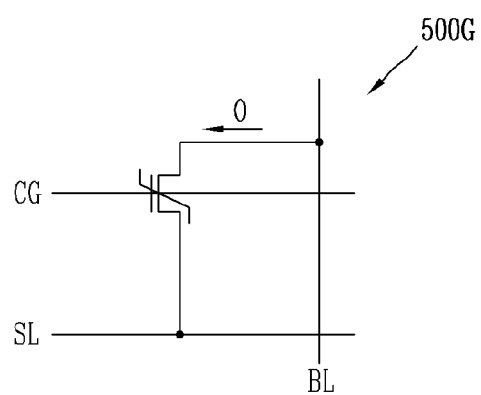

FIG. 5G shows a synapse including a FeFET memory programmed to produce an output signal O at a predefined level. This input signal is applied through a signal line CG. The weight parameter is stored in the FeFET memory. The output signal O represents a multiplication of an input signal received and a weight parameter stored in the cell, supplied to a bit line BL.

Figure 5H:
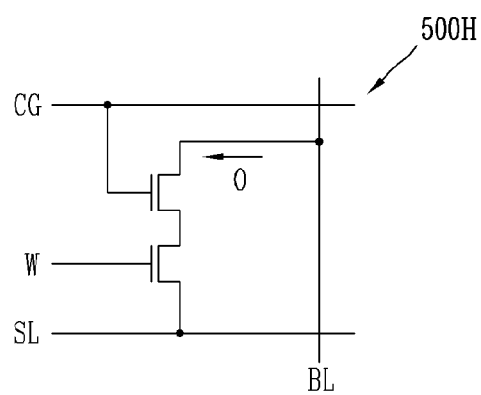
Figure 6A:
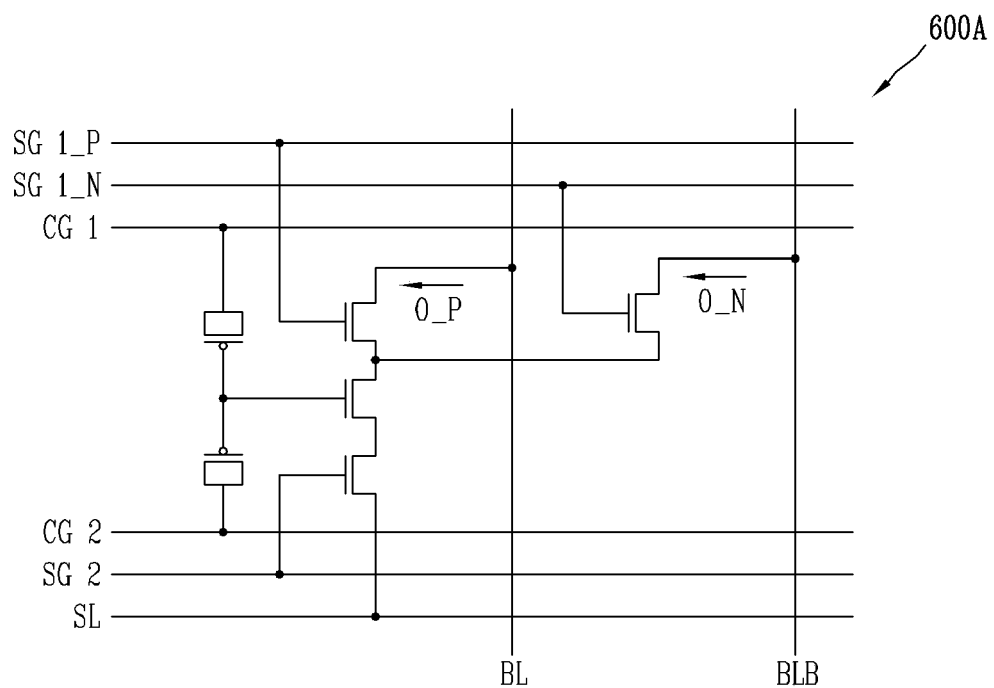
FIGS. 6A-6H illustrate schematic representations of the voltage-controlled current source for performing a signed operation.
Figure 6B:
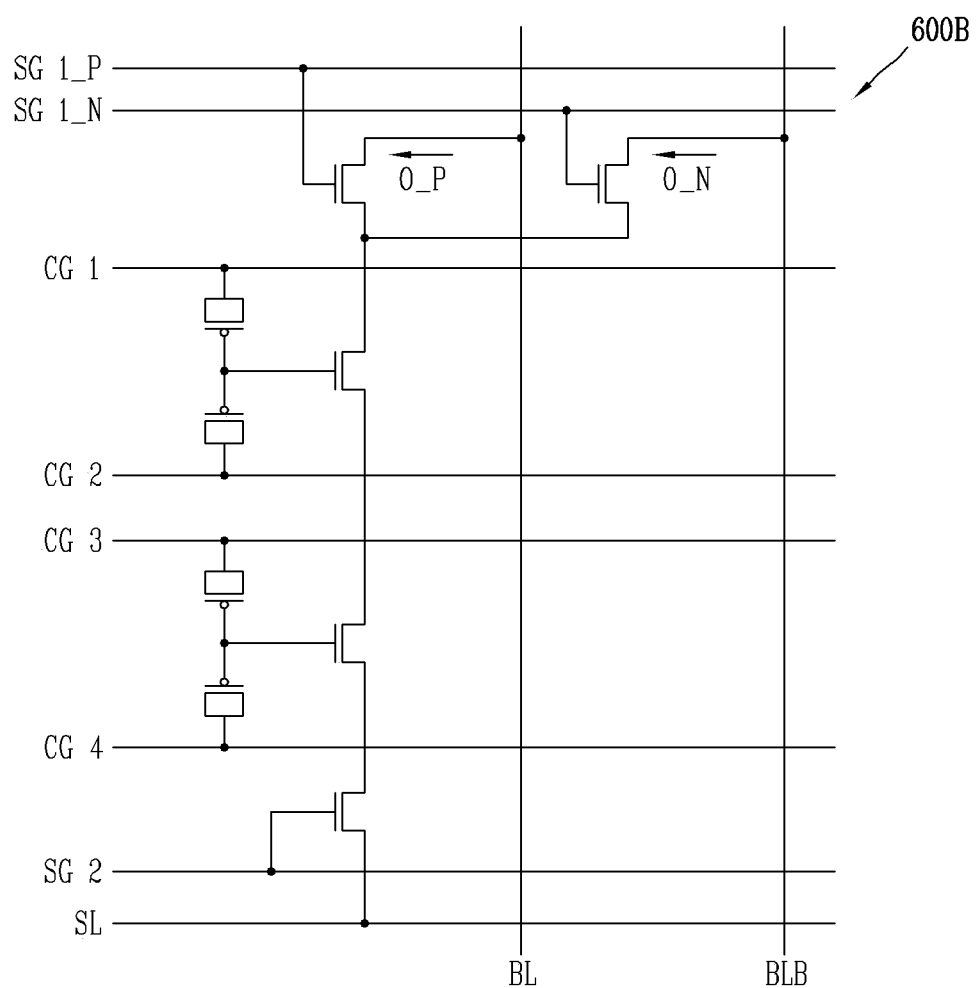
Figure 6C:
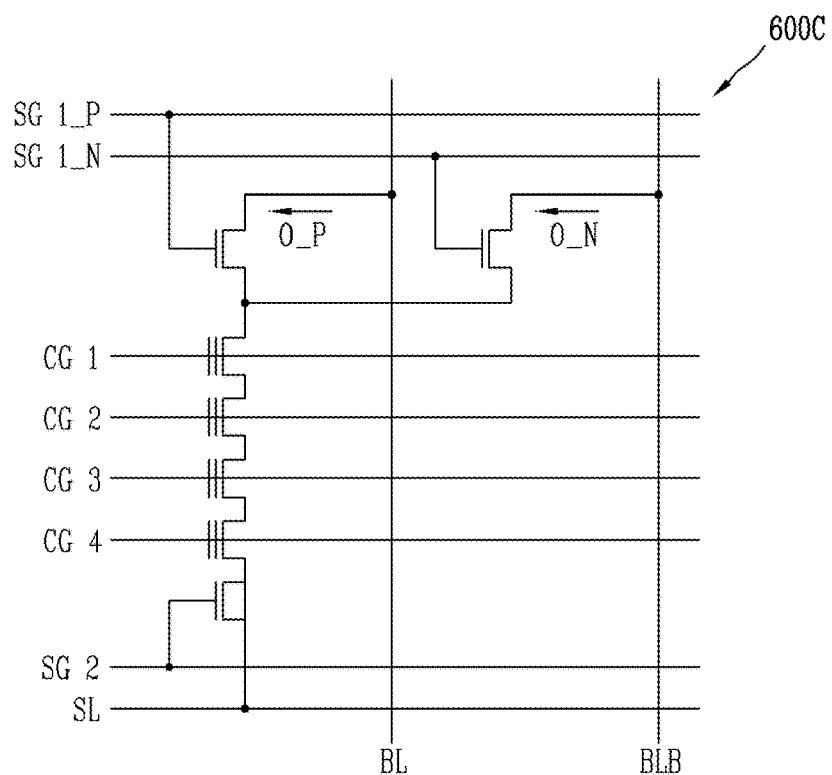
Figure 6D:
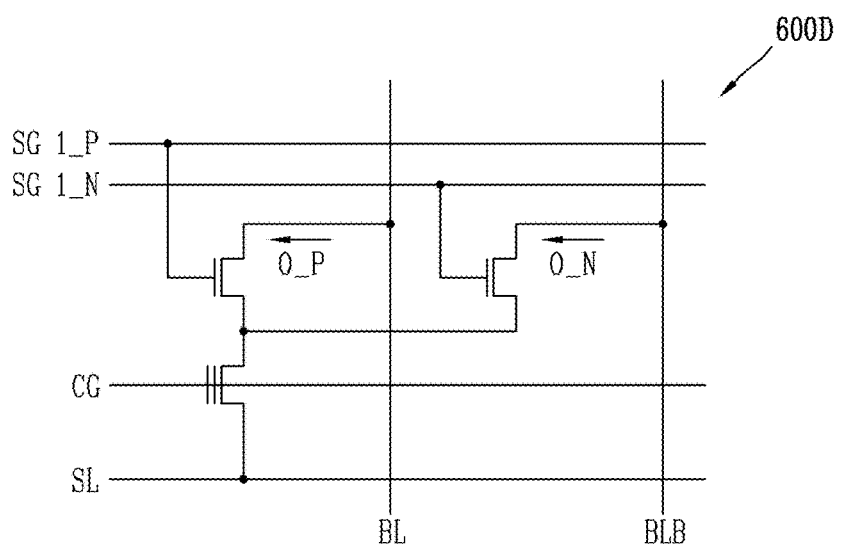
Figure 6E:
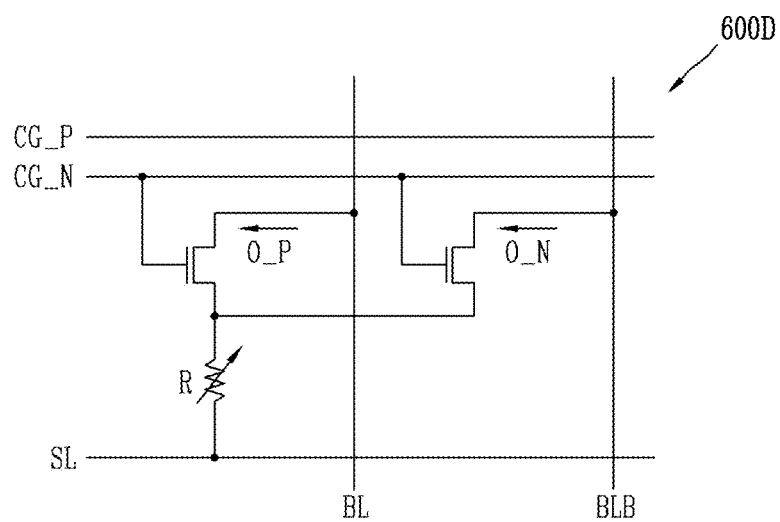
Figure 6F:
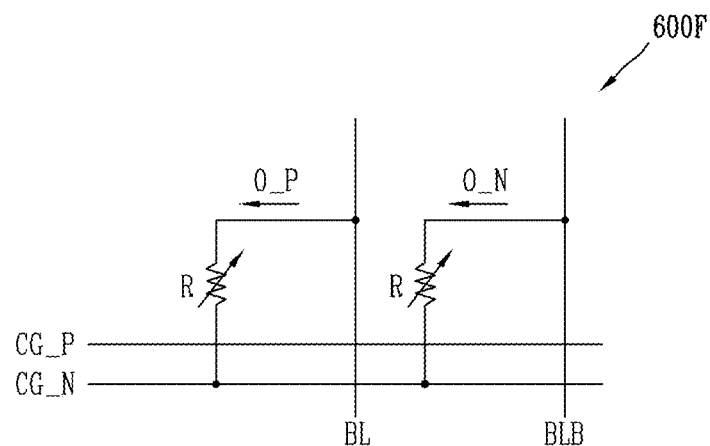
Figure 6G:
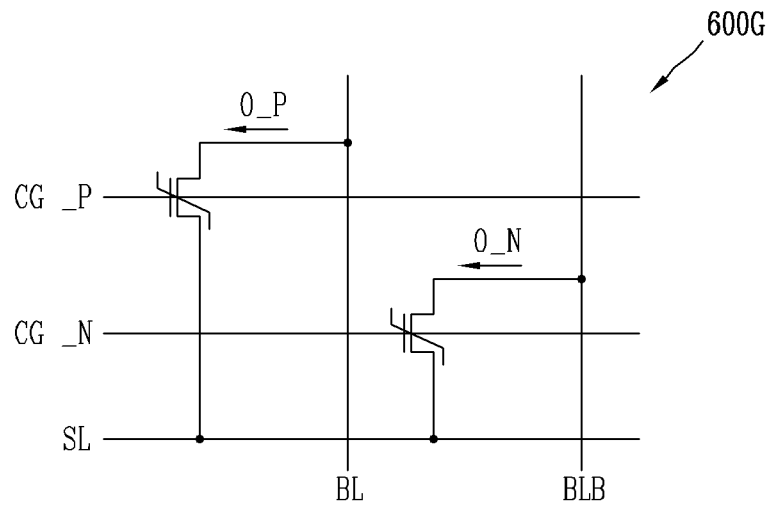
Figure 6H:
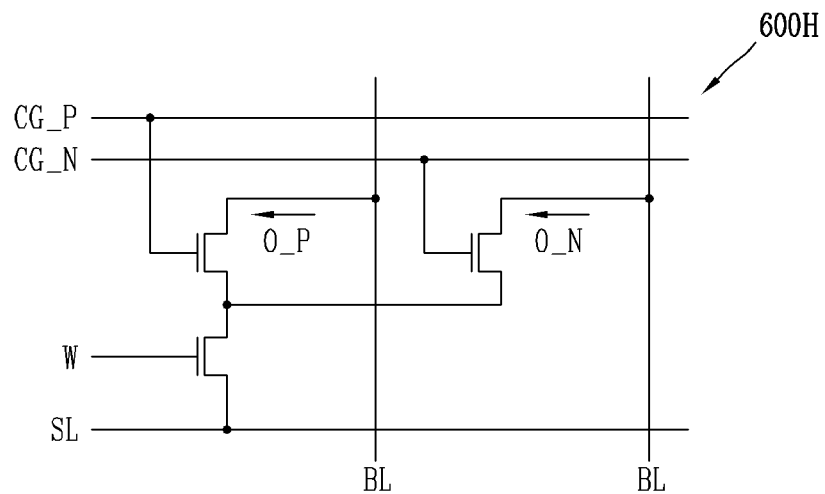

FIG. 5H shows a synapse including logic transistors with a weight memory (W) configured to produce an output signal O at a predefined level. The input signal is applied through a signal line CG. The weight parameter is stored in the weight memory W. The output current O is supplied to the BL by turning the switching transistor connected to CG. The output signal O represents a multiplication of an input signal received and a weight parameter stored in the cell. In addition to the depicted synapse, other types of synapses that are carefully programmed to the target current levels corresponding to the weight parameters of the neural network can be deployed.

FIGS. 6A-6H illustrate schematic representations of the embodied voltage-controlled source for performing a signed operation. The circuits in FIG. 6 have structures substantially similar to the circuits shown in FIG. 5 except that each synapse in FIGS. 6A-6H is configured to produce a pair of output signals O_P, O_N in response to a pair of input signals applied on SG1_P, SG1_N received, respectively.

Figure 7:
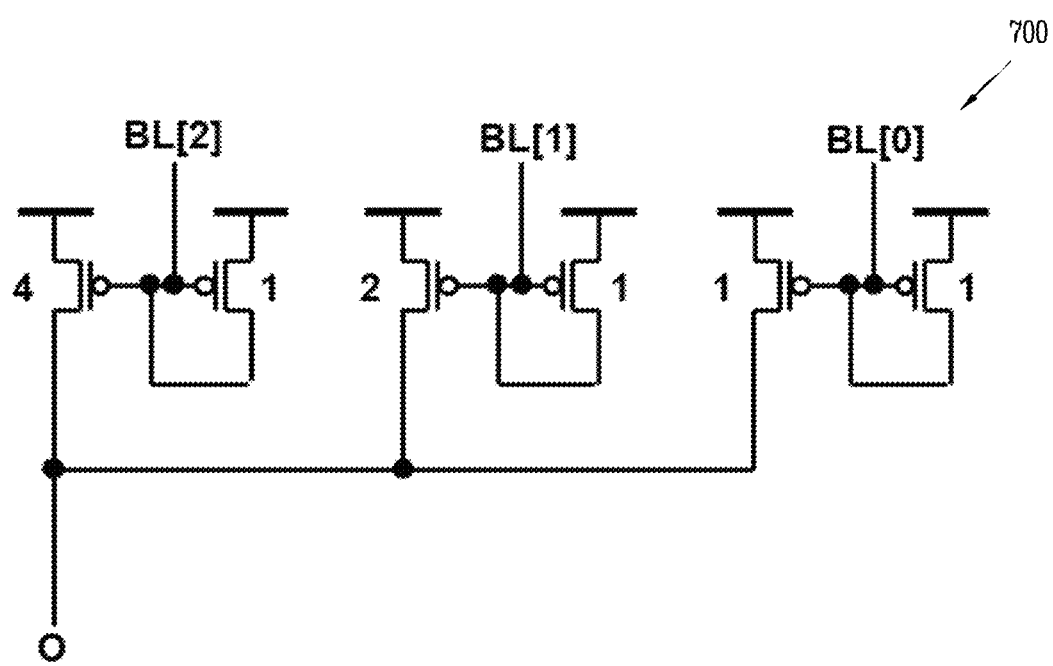
FIG. 7 illustrates a schematic representation of an analog accumulator.

FIG. 7 shows a schematic representation of the embodied current accumulator circuit having a plurality of current mirror circuits, each having a plurality of pairs of PMOS-type transistors, as an embodiment of the main and/or reference synapses. In FIG. 7, the current mirror circuits each have been configured to receive mirrored current 1 in bit lines BL [2], BL [1], and BL [0] and provide amplified mirrored currents of 4, 2, and 1 to the other branch, respectively, and accumulate those currents to the one output node O. As illustrated here, each current mirror circuit may include one pair of PMOS transistors. Gates of the paired transistors MA and MB in each circuit are connected through each of the common gate nodes of the transistors. In each circuit, the common gate node is connected to a drain of the transistor MB and one of the bit lines BL [2], BL [1], and BL [0].

Figure 8:
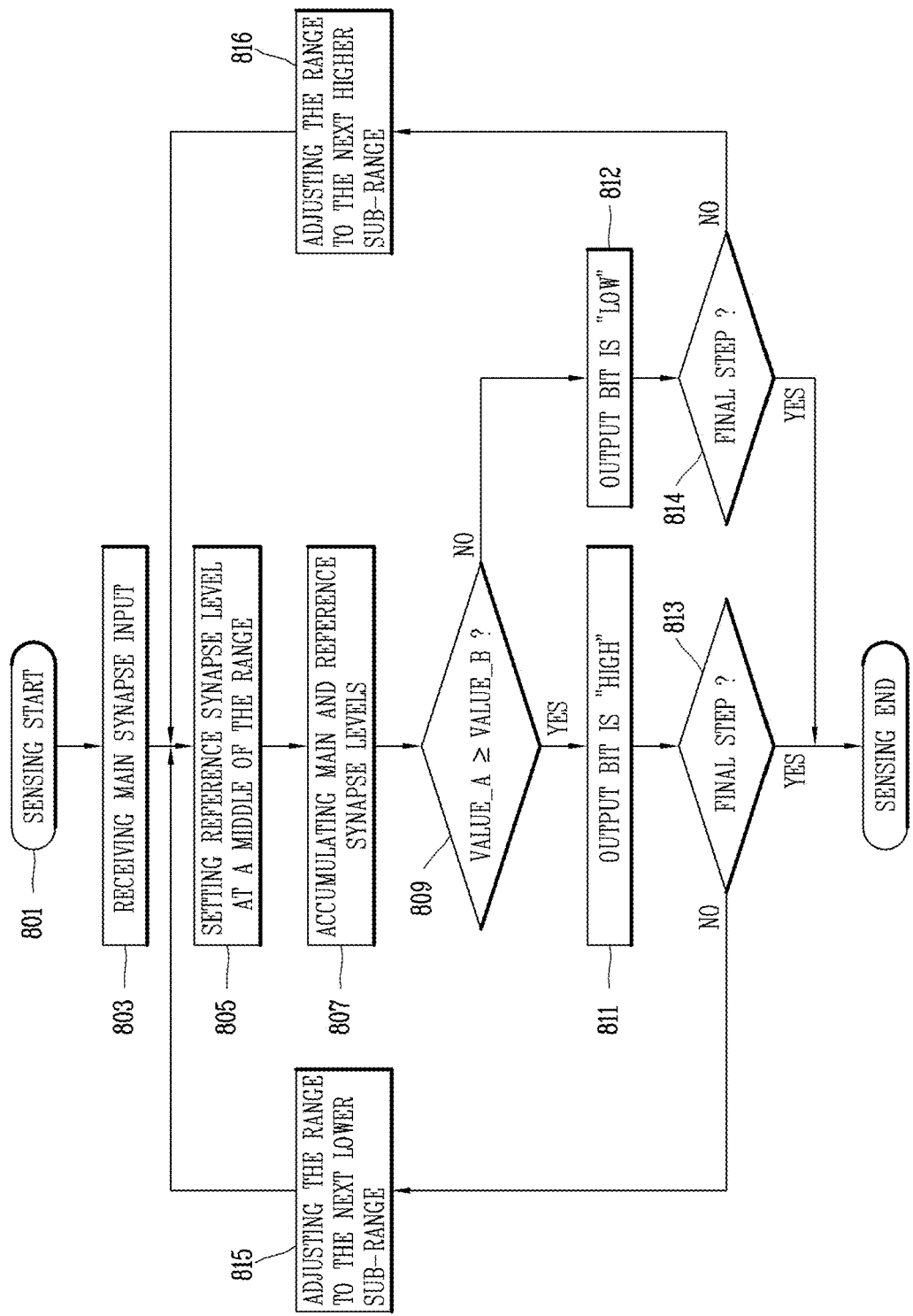
FIG. 8 is a flowchart for one embodiment of an inference process using a binary search method.

FIG. 8 is a flowchart for one embodiment of an inference process for the main synapse level generated using a binary search method. In this particular case, assume that the synapse array in FIGS. 2A-2B performs a signed or unsigned operation. Also, note that the main synapse in the main synapse array 130 can be as depicted in FIGS. 3A-3B. The reference synapse 150 can be as shown in FIGS. 4A-4B. Also, note that one or more inputs for the main synapse array 130 are serialized. Thus, the outputs derived from the inputs are generated at predefined time intervals.

At step 801, the sensing circuit 190 begins sensing an output product generated by one or more selected main synapses in a column. At step 803, the sensing circuit 190 can set an initial reference range of the output generated by reference synapse 150 that a binary search scheme to apply. An associated full continuous reference range can be defined based on the predefined product output. For instance, for a given unsigned operation to perform, the sensing circuit 190 can determine an initial reference range from 0 to 8. For a signed operation to perform, the initial reference range can be from −8 to 8.

At step 805, the sensing circuit 190 can set a reference (synapse) level from an estimated middle value in the initial reference range. For example, for the unsigned operation, the estimated middle value (the reference level) can be calculated at 4 (=(0+8)/2). On the other hand, for the signed operation, the middle value (the reference level) can be set at 0 (=(−8+8)/2). At step 807, the output from the one or more main synapses is accumulated with the output corresponding to the calculated reference synapse level via the corresponding bit line.

At step 809, the sensing circuit 190 can determine whether an accumulated output Value_A including the reference synapse level is equal to, greater, or less than a Value_B which can be a predetermined threshold or another accumulated output. For an unsigned operation, the accumulated output (O in FIG. 2A) and the predetermined threshold can be set to the Value_A and the Value_B, respectively. For a signed operation, an accumulated P output (O_P in FIG. 2B) and an accumulated N output (O_N in FIG. 2B) can be set to the Value_A and the Value_B, respectively.

At step 811, the sensing circuit 190 can output a high signal if Value_A is equal to or greater than Value B. At Step 813, after outputting the high signal, the sensing circuit 190 can determine whether the current comparison is the final step predefined. At step 815, upon determining that the current comparison is not the final comparison step and the output bit is high, the sensing circuit 190 changes the reference range to the lower half of the range and repeats steps 807 and 809. For example, the next range can be from 0 to 4 (i.e., the lower half of 0~8) for the unsigned operation. On the other hand, the next range can be from −8 to 0 (i.e., the lower half of −8~8) for the signed operation.

At step 812, the sensing circuit 190 outputs a low sensing signal if Value_A is less than Value_B. At step 814, after outputting the low signal, the sensing circuit 190 can determine whether the current comparison is the final step predefined. At step 816, after determining that the current comparison is not final and the output bit is low, the sensing circuit 190 can change the range of the reference to the higher half of the range and repeat steps 807 and 809. For example, the next range can be from 4 to 8 (i.e., the higher half of 0~8) for the unsigned operation. On the other hand, the next range can be from 0 to 8 (i.e., the higher half of −8~8) for the signed operation.

Then, in the next iteration step, the reference synapse level is set at the middle of the adjusted range. For example, if the adjusted range is from 0 to 4, then the reference synapse level is set at 2 (=(0+4)/2). If the adjusted range is from −8 to 0, then the reference synapse level is set at −4 (=(−8+0)/2). If the adjusted range is from 4 to 8, then the reference synapse level is set at 6 (=(4+8)/2), and if the adjusted range is from 0 to 8, then the reference synapse level is set at 4 (=(0+8)/2). Once the main and reference synapse levels are accumulated again, the resulting values Value_A and Value_B are again compared in the sensing circuit 190. Like the previous iteration, the next range of the reference can be adjusted to the next half of the previous range in a binary search form (i.e., sub-range is halved from the previous range) and repeat the iteration until the predefined final step is finished. For n-bit information to be identified, n-times iteration steps shall be conducted.

Figure 9:
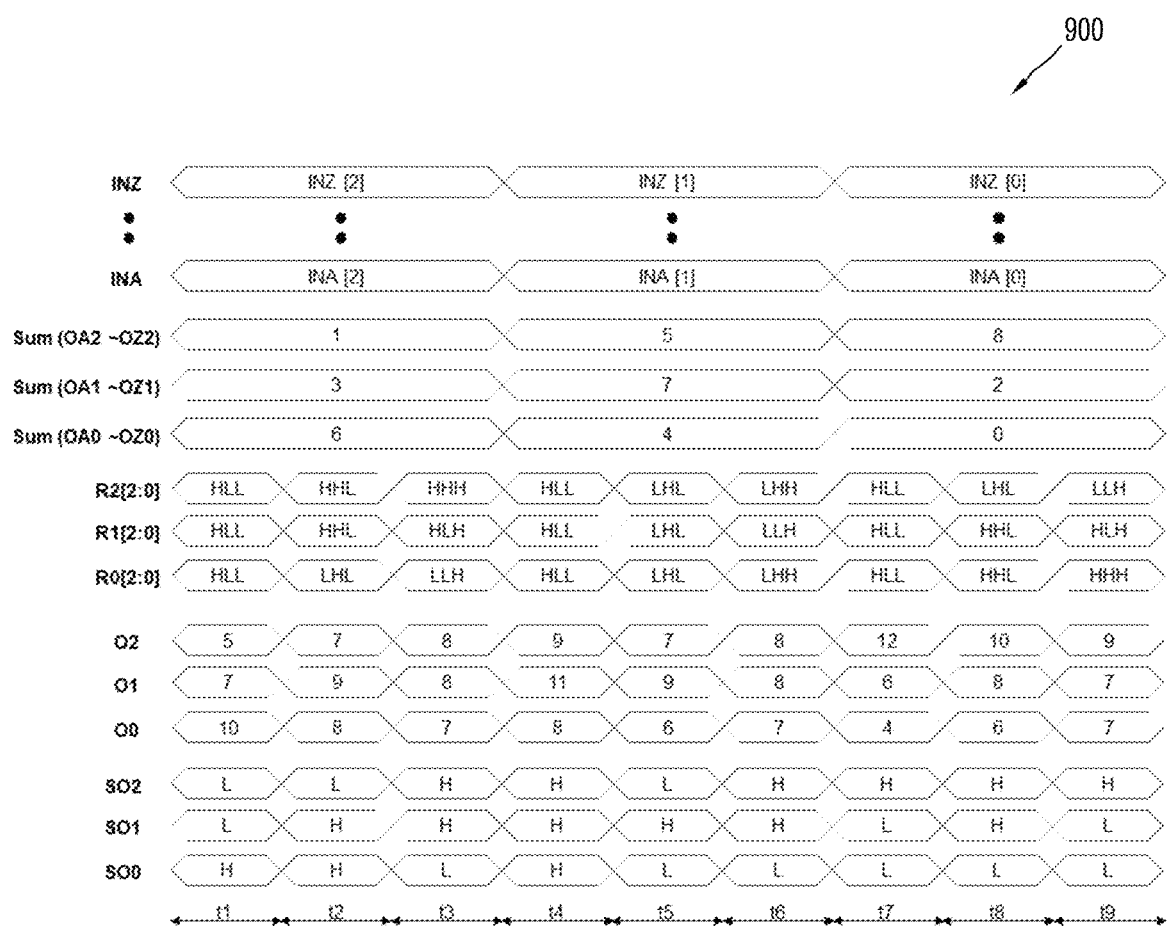
FIG. 9 is a timing diagram for one embodiment of implementing an unsigned operation.

FIG. 9 is a timing diagram for one embodiment of implementing an unsigned operation. All of the signals/values described herein are processed in the synapse array shown in FIG. 2(A) for an unsigned operation. More specifically, the use of the synapses in the three columns of the synapse array can be assumed. Also, each of the three sensing circuits in the array can produce sensing outputs SO2, SO1, and SO0 based on the summed outputs O2, O1 and O0 received. Also, note that each of notations R2[2:0], R1[2:0] and R0[2:0] refer to three control bit signals for activating each reference synapse having three reference voltage-controlled sources [2], [1] and [0], as shown in FIG. 4A, to produce a particular output predefined. Further, specified time intervals serialize the one or more inputs (INZ through INA) for the main synapses selected such that the corresponding outputs derived are serialized at the time intervals t1~t9.

In diagram 900, INZ and INA denote main synapse inputs for a set of main synapses Z0, Z1, and Z2 and another set of main synapses A0, A1, and A2, respectively. Each of the main synapse inputs (INZ~INA) is serialized when transmitted to three columns' corresponding main synapses. In light of FIG. 2A, here the inputs INZ~INA are serialized and the [2] bit (i.e., INZ [2], INA [2]), [1] bit (i.e., INZ [1], INA [1]) and [0] bit (i.e., INZ [0], INA [0]) are processed during the time intervals, t1-t3, t4-t6, and t7-t9, respectively.

Sum (OA2[2:0]~OZ2[2:0]) indicates that the sum of the outputs, each output produced by the main voltage-controlled current sources [2], [1], and [0] in each of the main synapses A~Z in the third column. As an exemplary serialized output, "1" from the series "1 5 8" is the third column main synapses' sum during the intervals t1~t3. "5" from the sequence is a sum of the third column Main Synapses' outputs during the intervals t4~t6. "8" from the sequence is a sum of the third column Main Synapses' outputs during the intervals t7~t9. Sum (OA1[2:0]~OZ1[2:0]) denotes a sum of outputs produced by the second column main synapses in FIG. 2(A). "3" from the series "3 7 2" is the second column main synapses' sum during the intervals t1~t3. "7" from the sequence is the second column main synapses' sum during the intervals t4~t6. "2" from the series is the second column main synapses' sum during the intervals t7~t9. Sum (OA0[2:0]~OZ0[2:0]) denotes a sum of product outputs produced by the first column synapses in FIG. 2(A). "6" from the sequence "6 4 0" is the first column main synapses' sum during the intervals t1~t3. "4" from the sequence is the first column main synapses' sum during the time intervals t4~t6. "2" from the sequence is the first column main synapses' sum during the time intervals t7~t9.

R2[2:0] denotes a set of control bit signals from the sensing circuit 190 to activate or deactivate the reference voltage-controlled current sources [2], [1] and [0] in the third column reference synapse R2. For instance, the sensing circuit 190 activates the R2[0], deactivates the R2[1], and R2[2] by setting the corresponding control bits to H, L, and L, respectively, during the time interval t1. Also, during the time interval t2, the sensing circuit 190 activates the R2[0] and R2[1] but deactivates the R2[2] by setting the corresponding control bits to H, H, and L, respectively. During the time interval t3, the sensing circuit 190 activates the R2[0], R2[1], R2[2] by setting the corresponding control bits to H, H, and H, respectively. Similarly, each control bit signal of R2 [2:0] can be suitably set for different input signal bits (and corresponding summed outputs explained below) for the other time intervals. R1[2:0] is a set of control bit signals from the sensing circuit 190 to activate or deactivate the reference voltage-controlled current sources [2], [1] and [0] in the second column reference synapse R1. R0[2:0] is a set of control bit signals from the sensing circuit 190 to activate or deactivate the reference voltage-controlled current sources [2], [1] and [0] in the first column reference synapse R0.

O2, O1, and O0 are the summed outputs from the analog accumulator 170 in the third, second, and first columns of the main synapse array 130, respectively, as shown in FIG. 2A. Those accumulated outputs are the accumulation of (1) a product output from one or more of the main synapses in a given column and (2) a specified output from one or more of the reference synapses in the column activated. For instance, the value 5 of O2 is the third column analog accumulator's output during the time interval t1: the sum of (a) the product output of the third column main synapses (OA2~OZ2), which is 1, and (b) the output of the third column reference synapse activated by the control bit signals HLL, which is 4. The value 7 and 8 of O2 is the third column analog accumulator's output during the time intervals t2 and t3, respectively. Likewise, the values 7, 9 and 8 of O1 is the second column analog accumulator's output during the time intervals t1, t2 and t3: the sum of (a) the product output of the second column Main Synapses (OA1~OZ1), which is 3, and (b) the output of the second column Reference Synapses activated by the control bit signals of R1[2:0] (HLL, HHL, and HLH)), which is 4, 6, 5, during each time interval t1, t2, and t3. The values 10, 8 and 7 of O0 is the first column analog accumulator's output during the time intervals t1, t2, and t3: the sum of (a) a product output of the first column Main Synapses (OA0~OZ0), which is 6, and (b) the output of the first column reference synapses activated by the control bits of R0[2:0] (HLL, LHL, and LLH), which is 4, 2, 1, during each time interval t1, t2, and t3.

SO2, SO1 and SO0 are sensing outputs generated by the sensing circuits in FIG. 2A. The output signal can be a binary value. The sensing circuit can detect the level of the outputs O2, O1 and O0 and determine whether the sensed level is more or less than the threshold value, which is predetermined or calibrated by the user. Once sensing that the sensed output is equal to or higher than the threshold level, the sensing circuit can output a high sensing signal H to its output node, SO, or otherwise, can output a low signal L to its output node, SO. Thus, the sensing circuit can perform a single-bit sense operation per each step or preset time interval.

SO2 of L is generated as the output O2 of 5 is less than the threshold value (here in 8) for the time interval t1. Consequently, SO2 of L is generated as the output O2 of 7 is less than the threshold value for the time interval t2. Consequently, SO2 of H is generated as the output O2 of 8 is equal to the threshold value for the time interval t3. This Sensing Circuit's operation of comparing and generating the corresponding sensing output signal in response to the O2 output is repeated through the given time intervals, i.e., time intervals t1 through t9. SO1 of L is generated as the output O1 of 7 is less than the threshold value for the interval t1. Consequently, SO1 of H is generated as the output O1 of 9 is higher than the threshold value for the interval t2. Then SO1 of H is generated as output O1 of 8 is equal to the threshold value for the interval t3. This sensing circuit comparing and generating the sensing output in response to the O1 output received is repeated through the given time intervals, i.e., time intervals t1 through t9. SO0 of H is generated as the output O0 of 10 is higher than the threshold value for the time interval t1. Consequently, SO0 of H is generated as the output O0 of 8 is equal to the threshold value for the time interval t2. Then SO0 of L is generated as output O0 of 7 is less than the threshold value for the interval t3. This Sensing Circuit's operation of comparing and generating the corresponding sensing output signal in response to the O0 output received is repeated through the given time intervals, i.e., time intervals t1 through t9.

Figure 10:
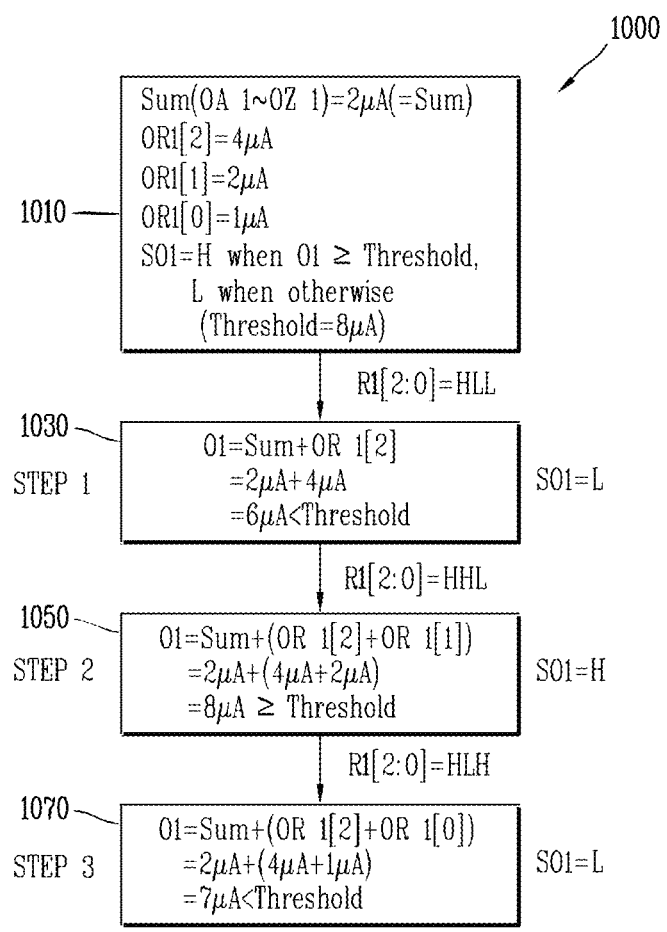
FIG. 10 is a flowchart for another embodiment of an inference process using a binary search method.

FIG. 10 is a flowchart for one embodiment of an inference process for searching the main synapse level using a binary search method. Before describing the binary search steps, it needs to be noted that this inference process applies to the synapse array configured to perform an unsigned operation, as shown in FIG. 2A. This particular sensing process shows how three binary search steps have determined the main synapses sum of 2 μA from the second column synapses (A1~Z1) in FIG. 2A. In a presetting step 1010, the sensing circuit 190 is set to begin a binary search for the sum of the main synapse outputs (OA1~OZ1) of 2 μA from the second column synapses A1~Z1.

It should be noted that, as a defaulting setting, the reference voltage-controlled current sources R[2], R[1] and R[0] of the reference synapse R1 in this second column are considered to generate the corresponding reference outputs OR1[0]=1 μA, OR1[1]=2 μA and OR1[2]=4 μA since they are accumulated with a weight (i.e., 1, 2, 4) from the accumulator circuit shown in FIG. 7. Also, the sensor circuit 190 is configured to generate a high sensing output signal SO1 of H when the output O1 is equal to or greater than the predefined sensing threshold of 8 μA. Otherwise, a low sensing output signal low SO1 of L will be generated.

Then, the sensing circuit 190 can infer the value by employing the three binary search steps (Steps 1~3) for determining it with three-bit resolution of the magnitude. Note that more steps with more reference synapses can provide more resolution of the magnitude determined from this inference process for the main synapse level. The number of steps can be predetermined or set by the user. Here, the resolution of the estimated sum's magnitude is an estimated value of 1 μA, since the lowest reference synapse level is 1 μA (=OR1[0]). If there were only two steps applied with two references OR1[2] and OR1[1] without proceeding the step 3, then the resolution of the estimated sum's magnitude would be 2 μA, since the lowest reference synapse level is 2 μA (=OR1[1] in the process then.

Initially, the sensing circuit 190 sets the full reference range between 0 and 8 μA, and therefore, the reference synapse level is set at 4 μA. Then, to implement this reference level, the sensing circuit 190 activates the reference voltage-controlled current source [2] while deactivating the reference voltage-controlled current Sources [1] and [0] by sending the control signals R1[2:0] of HLL. As a result, the corresponding reference output OR1[2:0] to BL1[2:0] is accumulated to be 4 μA after the analog accumulator 170 performs the operation.

In the first step 100, the summed current O1 of 6 μA including the main synapse level output sum of 2 μA and the reference synapse level of 4 μA is less than the threshold current 8 μA. Thus, the sensing circuit 190 generates a low-level output signal (SO1=L) and adjusts the full reference range to the next higher sub-range (i.e., 4~8 μA). Then, the next reference synapse level is set at an estimated middle of the higher sub-range, which is 6 μA, accordingly. To achieve this reference level of 6 μA, the sensing circuit 190 activates the reference voltage-controlled current Sources [2] and [1] while deactivating the reference voltage-controlled current Source [0] by sending the control signals R1[2:0] of HHL. As a result, the corresponding reference outputs OR1[2:0] to BL1[2:0] are accumulated to be 6 μA after the analog accumulator 170 performs the operation.

In the second step 1050, the value of summed current O1 of 8 μA including the main synapse level sum of 2 μA and the reference synapse level of 6 μA is equal to or greater than the threshold current 8 μA. Thus, the sensing circuit 190 generates SO1 of H and adjusts the reference range to the next lower sub-range (i.e., 4~6 μA). Then, the next reference synapse level is adjusted at an estimated middle of the higher sub-range, which is 5 μA. To achieve this reference level of 5 μA, the sensing circuit 190 activates the reference voltage-controlled current Sources [2] and [0] while deactivating the reference voltage-controlled current Source [1] by sending the control signals R1[2:0] of HLH. As a result, the corresponding reference outputs OR1[2:0] to BL1[2:0] are accumulated to be 5 μA after the analog accumulator 170 performs the operation.

In the third step 1070, the value of summed current O1 of 7 μA including the main synapse level sum of 2 μA and the reference synapse level of 5 μA is less than the threshold current of 8 μA. Thus, the sensing circuit 190 generates SO1 of L. When finishing this predetermined final step, the main synapse level sum is determined at about 2 μA by reading the sequential outputs of SO1: L, H, L.

Figure 11:
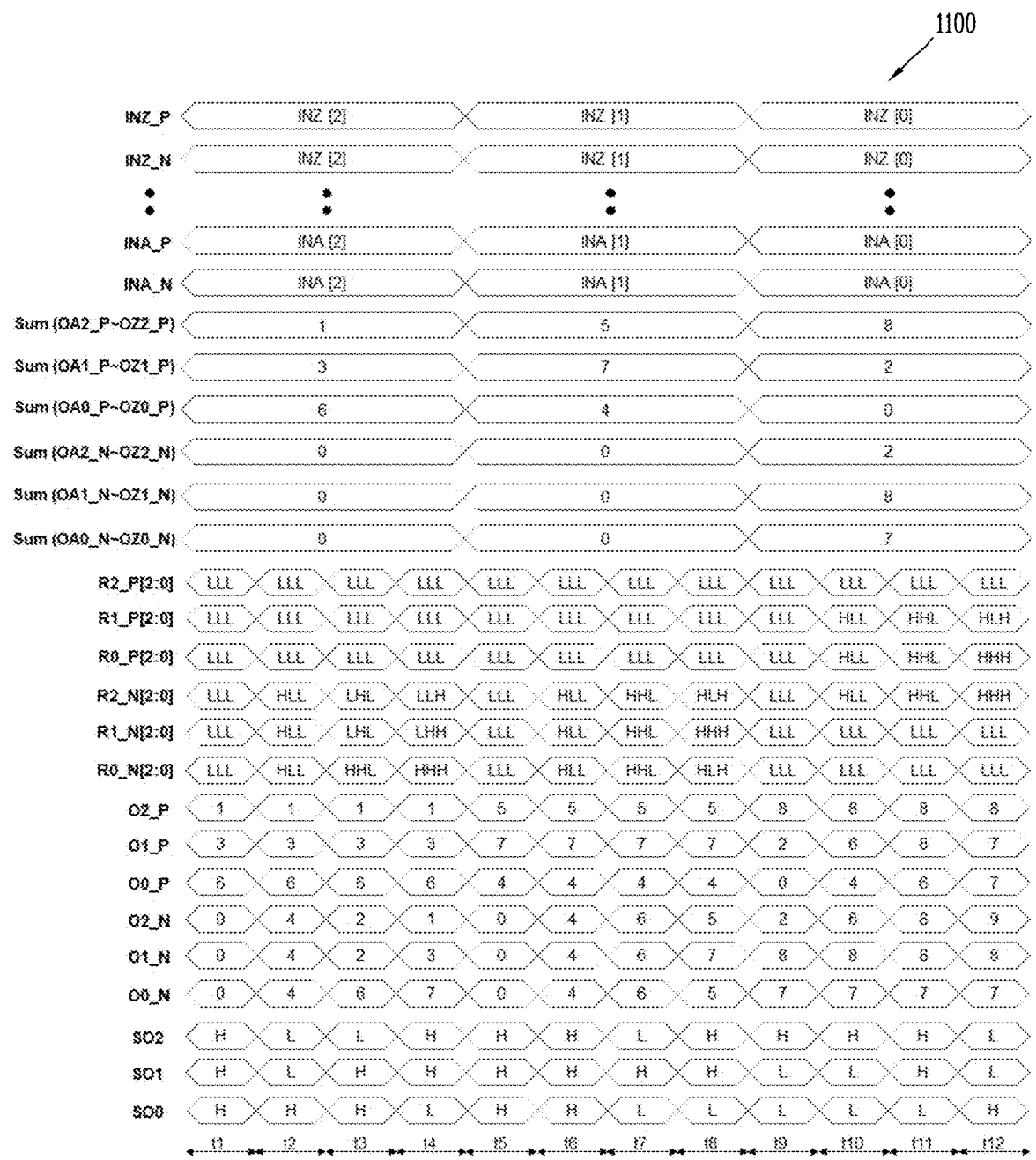
FIG. 11 is a timing diagram for one embodiment of implementing a signed operation.

FIG. 11 shows a signal timing diagram of the synapses for operating a signed operation according to the present invention. Before describing the timing diagram, note that all of the signals/values described herein are processed when the synapse array in FIG. 2B performs a signed operation. More specifically, the use of the synapses in the three columns of the synapse array can be assumed. Also, each of the three sensing circuits in the array can produce sensing outputs SO2, SO1, and SO0 based on the comparisons for each output pair: O2_P and O2_N, O1_P and O1_N, and O0_P and O0_N received, as shown in FIG. 2(B).

Also, note that each of notations R2_P [2:0], R1_P [2:0], R0_P [2:0], R2_N [2:0], R1_N [2:0], R0_N [2:0] refer to three control bit signals for activating the reference synapse R [2], R [1] and R [0] to produce a particular output specified, as shown in FIG. 4(B). Further, specified time intervals serialize the pair of main synapse inputs (INZ_P/INZ_N through INA_P/INA_N) for the main synapses selected such that the corresponding outputs derived are serialized at the time intervals t1~t9.

The INZ_P and INZ_N input pair from the main synapse driver row Z is applied to the main synapses in three columns, as shown in light of FIG. 2B. The INZ_P and INZ_N input pairs for the main synapses Z2, Z1, and Z0 are serialized and the [2] bit (i.e., INZ_P [2], INZ_N [2]), [1] bit (i.e., INZ_P [1], INZ_N [1]) and [0] bit (i.e., INZ_P [0], INZ_N [0]) are processed during the time intervals t1-t3, t4-t6 and t7-t9, respectively. Also, the INA_P and INA_N input pairs for the main synapses A2, A1 and A0 are serialized and the [2] bit (i.e., INA_P [2], INA_N [2]), [1] bit (i.e., INA_P [1], INA_N [1]) and [0] bit (i.e., INA_P [0], INA_N [0]) are processed during the time intervals t1-t3, t4-t6 and t7-t9, respectively.

Sum_P (OA2_P~OZ2_P) denotes a sum of P product outputs of the third column main synapses A2~Z2. P denotes the P outputs, as opposed to N outputs, from main voltage-controlled current sources [2], [1], and [0] in each of main synapses A2~Z2. The P outputs are applied on the bit lines BL2[2], BL2[1], and BL2[0], respectively. The series "1 5 8" are the summed P product of the third column main synapses A2~Z2 during the intervals t1~t3, t4~t6, and t7~t9, respectively. The series "3 7 2" are summed P products of the second column main synapses A1~Z1 during the intervals t1~t3, t4~t6, and t7~t9, respectively. The series "6 4 0" are summed products of the first column main synapses A0~Z0 during the intervals t1~t3, t4~t6, and t7~t9, respectively.

Sum_N (OA2_N [2:0]~OZ2_N [2:0]) denotes a sum of N product outputs of the third column Main Synapses A2~Z2. N denotes the N outputs, as opposed to P outputs, from main voltage-controlled current sources [2], [1], and [0] in each of main synapses A2~Z2. The N outputs are applied on the bit lines BLB2[2], BLB2[1] and BLB2[0], respectively. The series "0 0 2" is the summed N products of the third column Main Synapses A2~Z2 during the intervals t1~t3, t4~t6, and t7~t9, respectively. The series "0 0 8" are summed N products of the second column main synapses A1~Z1 during the intervals t1~t3, t4~t6, and t7~t9, respectively. The series "0 0 7" are summed N products of the first column main synapses A0~Z0 during the intervals t1~t3, t4~t6, and t7~t9, respectively.

R2_P [2:0] denotes a set of the control bit signals R2_P [2], R2_P [1] and R2_P [0] from the sensing circuit 190 to activate or deactivate reference voltage-controlled current Sources [2], [1] and [0] of the reference synapse R2, respectively, as shown in FIGS. 2B and 4B. For instance, the series "LLL" denotes a series of low, low, and low control bit signals for the reference voltage-controlled current sources [2], [1], and [0] during the time interval t1. Likewise, R1_P [2:0] denotes a set of the control bit signals R1_P [2], R1_P [1] and R1_P [0] from the sensing circuit 190 to activate or deactivate reference voltage-controlled current sources [2], [1] and [0] of the reference synapse R1, respectively. R0_P [2:0] denotes a set of control bit signals R0_P [2], R0_P [1] and R0_P [0] provided by the sensing circuit 190 to activate or deactivate reference voltage-controlled current sources [2], [1] and [0] of the reference synapse R0, respectively.

R2_N [2:0] denotes a set of control bit signals R2_N [2], R2_N [1] and R2_N [0] from the sensing circuit 190 to activate or deactivate reference voltage-controlled current Sources [2], [1] and [0] of the reference synapse R2, respectively. For instance, the series "HLL" denotes a series of high, low, and low control bit signals for the reference voltage-controlled current sources [2], [1], and [0] during the time interval t2. Likewise, R1_N [2:0] denotes a set of control bit signals R1_N [2], R1_N [1] and R1_N [0] from the sensing circuit 190 to activate or deactivate reference voltage-controlled current sources [2], [1] and [0] of the reference synapse R1, respectively. R0_N [2:0] denotes a set of control bit signals R0_N [2], R0_N [1] and R0_N [0] from the sensing circuit 190 to activate or deactivate reference voltage-controlled current sources [2], [1] and [0] of the Reference Synapse R0, respectively.

O2_P, O1_P, and O0_P denote the accumulated outputs from the analog accumulators in the third, second and first columns of the array, respectively. Those accumulated outputs are generated in response to the P inputs applied to the first, second and third column synapses, both the main and reference synapses. In other words, O2_P, O1_P, and O0_P each are the accumulated sum of (1) a product output from one or more of the main synapses in BLs of a given column and (2) a specified output from one or more of the reference synapses in BLs of the column activated.

For instance, the value 1 of O2_P at the time interval t1 is the sum of (a) the output of the third column main synapses (OA2_P~OZ2_P) and (b) the output of the third column reference synapses (R2_P [2:0]). Likewise, the value 3 of O1_P at the time interval t1 is the sum of (a) the output of the second column main synapses (OA1_P~OZ1_P) and (b) the output of the second column reference synapses (R1_P [2:0]). Also, the value 6 of O0_P at the time interval t1 is the sum of (a) the output of the first column main synapses (OA0_P~OZ0_P) and (b) the output of the first column Reference Synapses (R0_P [2:0]).

O2_N, O1_N, and O0_N denote the accumulated outputs from the analog accumulators in the third, second, and first columns of the array, respectively. Those accumulated outputs each are generated in response to the N inputs applied to the first, second and third column synapses-both the main and reference synapses. In other words, O2_N, O1_N, and O0_N each are the accumulated sum of (1) a product output from one or more of the main synapses in BLBs of a given column and (2) a specified N output from one or more of the reference synapses in BLBs of the column activated.

For instance, the value 2 of O2_N at the time interval t3 is the sum of (a) the output of the third column main synapses (OA2_N~OZ2_N) and (b) the output of the third column reference synapses (R2_N [2:0]). Likewise, the value 2 of O1_N at the time interval t3 is the sum of (a) the output of the second column main synapses (OA1_N~OZ1_N) and (b) the output of the second column reference synapses (R1_N [2:0]). Also, the value 6 of O0_N at the time interval t3 is the sum of (a) the output of the first column main synapses (OA0_N~OZ0_N) and (b) the output of the first column reference synapses (R0_N [2:0]).

When receiving the serialized pair of inputs (0_P and O_N) through their corresponding bit lines (BL and BLB), the sensing circuit 190 compares the P outputs O2_P, O1_P and O0_P with the N outputs O2_N, O1_N, and O0_N to produce the sensing outputs (i.e., SO2, SO1 and SO0), respectively, during the time intervals t1 through t11. Each of the sensing outputs SO2, SO1 and SO0 is represented by a binary value: a high signal H is for the P output equal to or greater than the N output, or otherwise, a low L is generated.

For instance, at time interval t1, the third column sensing circuit generates a high output signal (H) SO2 as the value of O2_P (P output), which is 1, is greater than the value of O2_N, which is 0. In contrast, at the time interval t2, the second column sensing circuit generates a low output signal (L) SO1 as the value of O1_P (P output), which is 3, is less than the value of O1_N (N output), which is 4. On the other hand, at the time interval t3, the first column sensing circuit generates a high output signal (H) SO0 as the value of O0_P (P output), which is 6, is equal to the value of O0_N (N output), which is 6.

Figure 12:
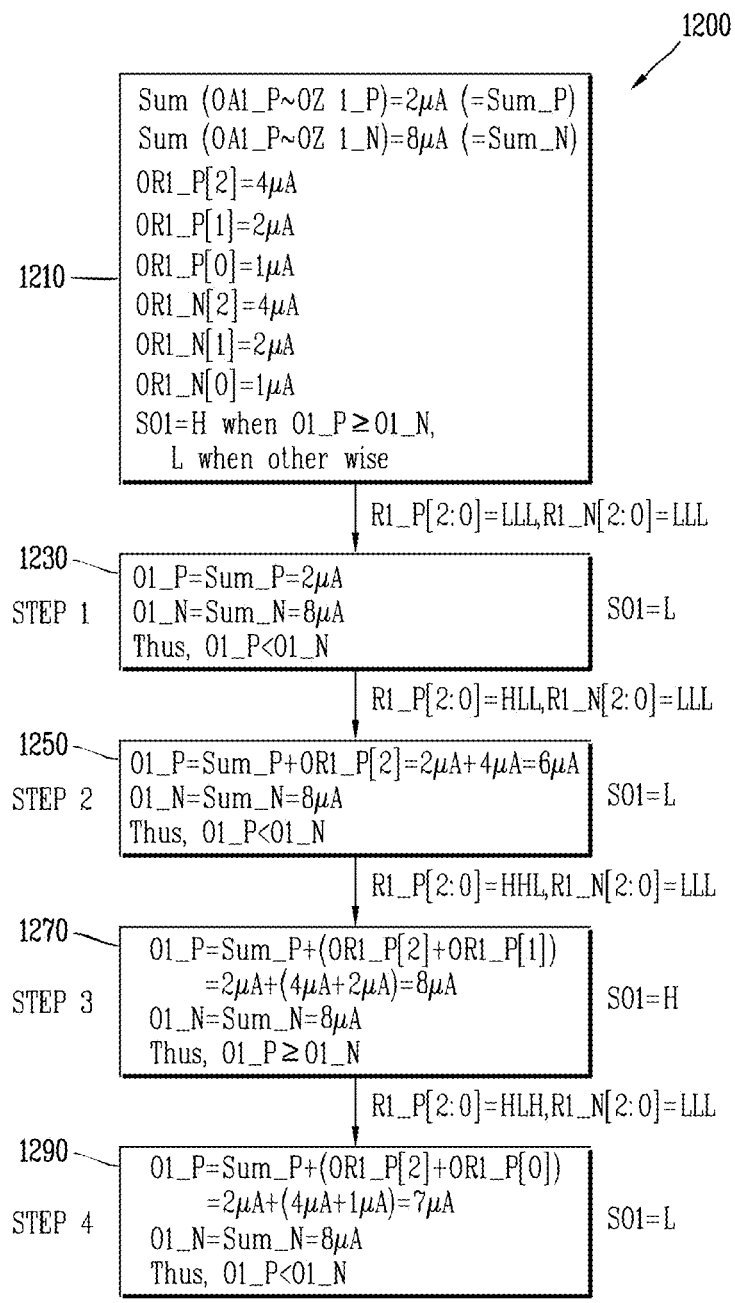
FIG. 12 shows a flow chart for one embodiment of an inference process using a binary search method.

FIG. 12 shows a flow chart for one embodiment of an inference process using a binary search method. Before describing the binary search steps, it needs to be noted that this inference process applies to the synapse array configured to perform a signed operation, as shown in FIG. 2B. Regarding the presetting step 1210, the second column sensing circuit 190 in the array receives a pair of P (O1_P) and N (O1_N) outputs from a pair of analog accumulators in FIG. 2(B). In the second column, a first of the paired analog accumulators accumulate a sum (=Sum_P) of positive outputs (OA1_P~OZ1_P) from a set of bit lines BL1[n−1]~[0], the outputs generated by the second column main synapses A1~Z1. A second of the paired analog accumulators accumulate a sum (=Sum_N) of negative outputs (OA1_N~OZ1_N) from a set of bit lines BLB1[n−1]~[0], the outputs generated by the second column main synapses A1~Z1. Here, in this example, 2 μA (=Sum_P) and 8 μA (=Sum_N) are given. Thus, the differential value of −6 μA between these values is determined from the process using a binary search method.

Then, the sensing circuit 190 can infer the difference between the sum of positive main synapse outputs (Sum_P) and the sum of negative main synapse outputs (Sum_N) by employing the four binary search steps (Steps 1~4) for the second column in FIG. 2B. Note that more steps with more reference synapses can provide more resolution of the magnitude difference determined from this inference process for the difference of the positive and negative main synapse levels. The number of steps can be predetermined or set by the user.

Since the accumulator 170 has 4:2:1 weights shown in FIG. 7, both positive and negative bits 2(BL [2], BLB [2]), 1(BL [1], BLB [1]) and 0 (BL [0], BLB [0]) of the reference synapse R1 in FIG. 3B are set to produce 4, 2 and 1 μA to the P output (O1_P) and N output (O1_N) after accumulated, if each of the corresponding control bits is activated. Note that if the different weights are applied in the accumulator, the resulting reference output current levels can be changed accordingly. The sensing circuit 190 is set to generate an output signal high SO1(H) when the P output (O1_P) is equal to or greater than the N output (O1_N), or otherwise, an output signal low SO1(L) will be generated.

Initially, the sensing circuit 190 sets the full reference range (i.e., −8~8 μA) and a reference synapse level at 0 μA by applying inputting low-level input (L) control signals to both the positive control bits R_P [2], R_P [1] and R_P [0] and the negative control bits R_N [2], R_N [1] and R_N [0] to deactivate all the reference synapse current. As a result, the corresponding reference outputs OR1_P [2]~[0] to BL1 [2]~[0] and OR1_N [2]~[0] to BLB1[2]~[0] are accumulated to the initial reference synapse level (which is defined as reference synapse level to BL minus reference synapse level to BLB) of 0 μA (=0 μA−0 μA) in the analog accumulator.

In the first step 1230, the resulting accumulated P and N outputs are 2 μA and 8 μA. As such, the sensing circuit 190 can detect the P output (O1_P) being less than the N output (O1_N), generating a sensing circuit output signal low (SO1=L). Also, the sensing circuit 190 adjusts the full reference range to the next higher sub-range (i.e., 0~8 μA). Then, the next reference synapse level is set at an estimated middle of the higher sub-range, which is 4 μA. To implement this reference level of 4 μA, the sensing circuit 190 activates the reference voltage-controlled current Source [2] to the BL1[2] while deactivating the reference voltage-controlled current Sources [1], [0] to the BL1[1], [0] and the reference voltage-controlled current Sources [2], [1], [0] to the BLB1 [2], [1], [0] by sending the control signals R1_P [2:0] of HLL and R1_N [2:0] of LLL. As a result, the corresponding next reference synapse level from OR1_P[2:0] to BL1[2:0] are accumulated to be 4 μA on O1_P, and the corresponding next reference synapse level to BLB1 from OR1_N[2:0] to BLB1[2:0] are accumulated to be 0 μA on O1_N.

In the second step 1250, the resulting accumulated P and N outputs (O1_P and O1_N) are 6 μA and 8 μA. Therefore, the sensing circuit 190 can detect the P output (O1_P) being less than the N output (O1_N), thus generating the sensing circuit output signal low (SO1=L). Also, the sensing circuit 190 adjusts the reference range to a next higher sub-range (i.e., 4~8 μA). Then, the next reference synapse level is set at an estimated middle of the higher sub-range, which is 6 μA, accordingly. To achieve this reference level of 6 μA, the sensing circuit 190 activates the reference voltage-controlled current Sources [2], [1] to the BL1[2], [1] while deactivating the reference voltage-controlled current Source [0] to the BL1, [0] and the reference voltage-controlled current Sources [2], [1], [0] to the BLB1[2], [1], [0] by sending the control signals R1_P [2:0] of HHL and R1_N [2:0] of LLL. As a result, the corresponding next reference synapse level from OR1_P[2:0] to BL1[2:0] are accumulated to be 6 μA on O1_P, and the corresponding next reference synapse level to BLB1 from OR1_N[2:0] to BLB1[2:0] are accumulated to be 0 μA on O1_N.

In the third step 1270, the resulting accumulated P and N outputs (O1_P and O1_N) are 8 μA and 8 μA. Therefore, the sensing circuit 190 can detect the P output (O1_P) being no less than the N output (O1_N), thus generating the sensing circuit output signal high (SI1=H). Also, the sensing circuit 190 adjusts the reference range to a next lower sub-range (i.e., 4~6 μA). Then, the next reference synapse level is set at the middle of the lower sub-range, which is 5 μA, accordingly. To achieve this reference level of 5 μA, the sensing circuit 190 activates the reference voltage-controlled current Sources [2], [0] to the BL1[2], [0] while deactivating the reference voltage-controlled current Source [1] to the BL1, [1] and the reference voltage-controlled current Sources [2], [1], [0] to the BLB1[2], [1], [0] by sending the control signals R1_P [2:0] of HLH and R1_N [2:0] of LLL. As a result, the corresponding next reference synapse level from OR1_P[2:0] to BL1[2:0] are accumulated to be 5 μA on O1_P, and the corresponding next reference synapse level to BLB1 from OR1_N[2:0] to BLB1[2:0] are accumulated to be 0 μA on O1_N.

In the fourth step 1290, the resulting accumulated P and N outputs (O1_P and O1_N) are 7 μA and 8 μA. Therefore, the sensing circuit 190 can detect the P output (O1_P) being less than the N output (O1_N), thus generating the sensing circuit output signal low (SO1=L). When finishing this final step, the difference of the accumulated sums (i.e., Sum_P−Sum_N) is determined to be −6 μA by reading the sequential outputs of SO1: L, L, H, L. Thus, with the proposed invention, 3-bit magnitude information of the synapse level shall be sensed by 3-step binary search after the first sign bit determining step.

What is claimed is:

1. A neural network device, comprising:
    a main synapse array having a plurality of main synapses in rows and columns of the array, each main synapse connected to one or more bit lines associated with the network device;
    a main synapse driver for applying an input to one or more of the main synapses in a row, each main synapse configured to receive sequential binary voltage input data from the main synapse driver, wherein the main synapse driver is configured to apply the sequential binary voltage input data to the one or more of the main synapses in a row;
    a reference synapse for generating a particular output to a selected one or more associated bit lines; and,
    a sensing circuit for controlling the reference synapse in generating the output in a selected column of the array, wherein the sensing circuit is adapted to infer an output from one or more main synapses in a selected column by:
    defining a reference range of the output to be generated by reference synapse;
    setting a reference level from the reference range;
    activating a selected reference synapse to implement the reference level that is set or adjusted; and
    comparing an output from the main synapse summed with the output from the activated reference synapse in the selected column with a threshold value predetermined, wherein the sensing circuit determines and transmits a control input signal to the reference synapse in the selected column for a next step of sensing based on the output from the main synapse summed with the output from the activated reference synapse in the selected column.

2. The neural network device of claim 1, wherein the sensing circuit is further configured to perform the steps of:
    (a) adjusting the reference range to a sub-range depending on the comparison result;
    (b) adjusting the reference level to an approximated middle of the adjusted reference range;
    (c) comparing a summed output including an output corresponding to the adjusted reference level from the selected reference synapse with the threshold value; and
    (d) repeating steps (a) to (c) according to a specified number of times or until the inferred output refined through the repeating steps reaches a target resolution specified.

3. The neural network device of claim 2, wherein the sensing circuit is further configured to adjust the reference range to a lower sub-range if the summed output is equal to or greater than the threshold value, or otherwise adjust the reference range to a higher sub-range.

4. The neural network device of claim 1, wherein the main synapse driver is further configured to serially apply a plurality of voltage input sequences corresponding to an input data to one or more of the main synapses in the row.

5. The neural network device of claim 4, wherein the sensing circuit is further configured to:
    receive an output current from one or more of the main synapses via a connected bit line in the selected column;
    set a reference range of the output current generated by the reference synapse that a binary search scheme to apply;
    define a reference level from the reference range;
    set none, one or more current sources in the selected reference synapse to generate an output corresponding to the reference level;
    compare an output current from the main synapse summed with the output current from the selected reference synapse in the column with a threshold value specified; and
    convert the comparison result into a corresponding binary signal.

6. The neural network device of claim 5, wherein the sensing circuit is further configured to perform the steps of:
    (a) adjusting the reference range to a sub-range depending on the comparison result;
    (b) adjusting the reference level to an approximate middle of the adjusted reference range;
    (c) comparing a summed output current including an output current corresponding to the adjusted reference level from the selected reference synapse with the threshold value; and
    (d) repeating steps (a) to (c) according to the specified number of times or until the inferred output refined through the repeating steps reaches a target resolution specified.

7. A neural network device, comprising:
    a main synapse array having a plurality of main synapses in rows and columns of the array, each main synapse for producing a differential output pair connected to one or more pairs of bit lines associated with the neural network device;
    a main synapse driver for applying a pair of inputs to the one or more main synapses in a row, each main synapse configured to receive sequential binary voltage input data from the main synapse driver, wherein the main synapse driver is configured to apply a pair of the sequential binary voltage input data to the one or more of the main synapses in a row;
    a reference synapse for generating a particular pair of outputs to a selected one or more associated pairs of bit lines; and a sensing circuit for controlling the reference synapse in generating the pair of outputs in a selected column of the array, wherein the sensing circuit is adapted to infer an output from the one or more main synapses in the selected column by:

defining a reference range of the output to be generated by reference synapse;

setting a pair of reference levels from the reference range;

activating the selected reference synapse to implement the reference level that is set or adjusted; and comparing a first and a second output of the differential output pair, wherein , the sensing circuit determines and transmits a pair of control input signals to the reference synapse in the column for a next step of sensing based on a pair of the accumulated outputs, each output including the output from the main synapse and the output from the reference synapse in the selected column.

8. A neural network device of claim 7, wherein the sensing circuit adapted to infer the difference of a pair of the outputs by further implementing steps of:
   (a) adjusting the reference range to a sub-range depending on the comparison result;
   (b) adjusting the reference level to an approximated middle of the adjusted range;
   (c) comparing a first and second output of the differential output pair, each output generated by the main synapse summed with an output corresponding to the adjusted reference level; and
   (d) repeating steps (a) to (c) according to a specified number of times or until the inferred output refined through the repeating steps reaches a target resolution specified.

9. The neural network device of claim 8, wherein the sensing circuit is adapted to infer the difference of a pair of the outputs by further implementing a step of adjusting the reference range to a lower sub-range if the first output is equal to or greater than the second output, or otherwise adjust the reference range to a higher sub-range.

10. The neural network device of claim 9, wherein the main synapse driver is further configured to serially apply a plurality of voltage input sequences corresponding to a plurality of input data to the one or more synapses in the row.

11. The neural network device of claim 10, wherein the sensing circuit is further configured to:
   receive an output current from one or more of the main synapses via the associated bit line in the selected column;
   set a reference range of the output current generated by the reference synapse that a binary search scheme to apply;
   define a reference level from the reference range;
   set none, one or more current sources in the selected reference synapse to generate an output corresponding to the reference level;
   compare an output current from the main synapse summed with the output current from the selected reference synapse with a threshold current value specified;
   and convert the comparison result into a corresponding binary signal.

12. A method for inferring an output from a synapse array, comprising:
   receiving an output of one or more main synapses in each selected column of the synapse array, the one or more of the main synapses are configured to receive sequential binary voltage input data from main synapse driver connected to the synapse array, wherein the main synapse driver is configured to apply the sequential binary voltage input data to the one or more of the main synapses in a row;
   defining a reference range of an output to be generated by a reference synapse in the selected column;
   setting a reference level from the defined reference range;
   activating the selected reference synapse to implement the reference level that is set or adjusted; and
   comparing a sum of an output from the main synapse and an output from the activated reference synapse with a threshold value predefined.

13. The method of claim 12, further comprising:
   (a) adjusting the reference range to a sub-range depending on the comparison result;
   (b) adjusting the reference level to an approximated middle of the adjusted range;
   (c) comparing a summed output including an output corresponding to the adjusted reference level from the selected column synapses with the threshold value; and
   (d) repeating steps (a) to (c) according to a specified number of times or until an inferred output refined through the repeating steps reaches a target resolution specified.

14. The method of claim 13, further comprising adjusting the reference range to a lower sub-range if the summed output is equal to or greater than the threshold value, or otherwise adjusting the reference range to a higher sub-range.

15. The method of claim 12, further comprising generating an output sequence depending on the comparison result of the summed output to the threshold value.

16. A method for inferring a differential output from a synapse array, comprising:
   receiving first and second outputs from one or more main synapses in a synapse array via one or more associated bit lines;
   defining a reference range of an output to be generated by a reference synapse connected to the one or more synapses;
   setting a reference level from the reference range;
   activating the selected reference synapse to produce an output corresponding to the reference level that is set or adjusted; and
   comparing first and second accumulated outputs, wherein each accumulated output includes the corresponding output from the main synapse and the output from a reference synapse selected, wherein a main synapse driver in a row of the synapse array is configured to serially apply sequential binary voltage input data to the one or more of the main synapses in the row.

17. The method of claim 16, further comprising:
   (a) adjusting the reference range to a sub-range depending on the comparison result;
   (b) adjusting the reference level to an approximated middle of the adjusted range;
   (c) comparing a first and second accumulated output of the differential output pair, one of the accumulated outputs generated by the main synapse summed with an output corresponding to the adjusted reference level; and
   (d) repeating steps (a) to (c) according to a specified number of times or until the inferred difference refined through the repeating steps reaches a target resolution specified.

18. The neural network of claim 17, further comprising adjusting the reference range to a lower sub-range if the first accumulated output is equal to or greater than the second accumulated output, or otherwise adjusting the reference range to a higher sub-range.

\* \* \* \* \*